US007077619B2

(12) United States Patent
Corrigan

(10) Patent No.: US 7,077,619 B2
(45) Date of Patent: Jul. 18, 2006

(54) CONTINUOUS MOTION ROBOTIC MANIPULATOR

(75) Inventor: Thomas R. Corrigan, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 454 days.

(21) Appl. No.: 09/905,095

(22) Filed: Jul. 13, 2001

(65) Prior Publication Data

US 2003/0010603 A1 Jan. 16, 2003

(51) Int. Cl.
*B66C 23/00* (2006.01)
(52) U.S. Cl. .................. 414/744.4; 901/1
(58) Field of Classification Search .............. 901/1, 901/14–26; 414/744.4
See application file for complete search history.

(56) References Cited

U.S. PATENT DOCUMENTS

| 4,569,627 | A | * | 2/1986 | Simunovic ............. 414/735 |
| 4,636,137 | A | * | 1/1987 | Lemelson .................. 901/1 |
| 4,647,784 | A | * | 3/1987 | Stephens .................. 901/1 |
| 4,664,590 | A | * | 5/1987 | Maekawa .................. 901/1 |
| 4,669,390 | A | * | 6/1987 | Bisiach .................... 901/1 |
| 4,698,775 | A | * | 10/1987 | Koch et al. ............... 901/1 |
| 4,823,536 | A | | 4/1989 | Manservigi et al. |
| 5,042,774 | A | | 8/1991 | Kakinuma |
| 5,257,888 | A | | 11/1993 | Kronseder |
| 5,378,033 | A | * | 1/1995 | Guo et al. ................ 294/116 |
| 5,392,586 | A | | 2/1995 | Imai |
| 5,488,277 | A | * | 1/1996 | Nishikawa et al. ......... 901/1 |
| 5,542,028 | A | * | 7/1996 | Minami .................... 901/1 |
| 5,678,980 | A | | 10/1997 | Grunes et al. |
| 5,789,878 | A | | 8/1998 | Kroeker et al. |
| 6,102,164 | A | | 8/2000 | McClintock et al. |
| 6,105,455 | A | * | 8/2000 | Rosheim ............... 74/490.06 |
| 6,246,200 | B1 | * | 6/2001 | Blumenkranz et al. ..... 901/1 |
| 6,393,335 | B1 | * | 5/2002 | Ostwald ................... 901/1 |
| 6,428,266 | B1 | * | 8/2002 | Solomon et al. ....... 414/744.4 |
| 6,463,360 | B1 | * | 10/2002 | Terada et al. .............. 901/1 |
| 2004/0013509 | A1 | * | 1/2004 | Roy et al. ................ 414/735 |

FOREIGN PATENT DOCUMENTS

EP 0 266 056 A1 5/1988

* cited by examiner

*Primary Examiner*—James R. Bidwell

(57) ABSTRACT

A continuous motion robotic device including a first robotic arm, a second robotic arm, a third robotic arm, and a drive system. The robotic arms are coaxially arranged, each including an end effector for performing useful work on an object and can continuously rotate a full 360. The drive system commonly controls the three robotic arms and defines a central axis about which the device rotates. The device is capable of high-speed operation in that the robotic arms are sequentially presented to various work environment stations via rotation about the central axis. In one preferred embodiment, each of the robotic arms provides three degrees of freedom. In another preferred embodiment, each robotic arm includes at least a first primary joint and a second primary joint, with the first primary joints being coupled and the second primary joints being coupled. Alternatively, the primary joints are decoupled.

14 Claims, 17 Drawing Sheets

CONTINUOUS MOTION ROBOTIC MANIPULATOR

BACKGROUND OF THE INVENTION

The present invention relates to a robotics-based, automated object-handling device. More particularly, it relates to a continuous motion device incorporating multiple, coaxially arranged robotic arms.

Automated object handling equipment is utilized in countless industrial applications. For example, automated processing equipment is useful for product or component construction, assembly, packaging, inspection, etc. In this regard, automated processing equipment can assume a wide variety of forms, but are generally categorized in one of two distinct classes. The first class of automated processing equipment is high-speed dedicated machinery characterized by continuous motion mechanisms, such as a rotating turntable, that allows the machinery to operate smoothly at high speeds. A second class, generally referred to as robotics, utilizes a reciprocating, computer controlled robotic arm to perform certain operations. Both classes of automated machinery have certain advantages and drawbacks. For example, dedicated machinery is typically less complex, and is able to process a much larger volume of components through various stations as compared to robotic machinery due to the continuous motion design. Conversely, robotic machinery is typically able to perform more complex motions, and can more readily be reconfigured or programmed for different work environments/handling requirements.

Efforts have been made to improve upon the effective speeds of robotic machinery. For example, U.S. Pat. No. 5,042,774 describes coaxially mounting two robotic arms. While providing enhanced operational capabilities, the arms are not capable of rotating 360°, and therefore cannot provide a more preferred, continuous motion. Conversely, other references, such as U.S. Pat. Nos. 5,678,980, 5,789,878, and 6,102,164 describe a semiconductor wafer-transferring device including two commonly linked robotic arms secured to a central hub. While effectuating a continuous motion feature, the so-described robotic arms are limited to two degrees of freedom, and operate in different planes. As a result, while satisfying specific constraints associated with semiconductor wafer processing, the described robotic assemblies have minimal usefulness for other manufacturing scenarios. Further, only two articles can be handled at any one time. Other continuous motion robotic arm designs are similarly limiting.

A multitude of design obstacles have contributed to the inability to perfect a continuous motion, multiple robotic arm system. First, it is not enough to simply stack two or more robotic arms on top of one another. In addition to the obvious complications associated with driving such a system, the arms are manipulated out-of-plane relative to one another, thereby limiting the potential manufacturing applications. Second, to optimize overall efficiency, it is greatly preferred that more than two robotic arms be provided with a single device. Once again, this constraint has heretofore presented insurmountable obstacles in devising an appropriate, and cost-effective, drive system. Third, for enhanced arm manipulation, it is preferred that each robotic arm be provided with three degrees of freedom. While single arm, three degree of freedom robots are well known, existing drive systems for these robotic devices are not amenable to a continuous motion, multi-arm device. Fourth, the availability of desired arms paths by coupling or uncoupling the various arms lengths has not been explored. Fifth, the system is preferably highly flexible. That is to say, an optimal continuous motion robotic system affords the user the ability to quickly and easily alter a portion of the system such that the resulting arm paths satisfy the requirements of different handling applications. These constraints in combination with industry's willingness to accept the drawbacks associated with dedicated machinery and robotic devices, have likely hindered design efforts into a continuous motion robotic handling device.

Material handling systems or machinery continue to evolve. Unfortunately, however, a system optimally combining the attributes of high-speed dedicated machinery and flexible or robotic machinery is currently unavailable. Therefore, a need exists for a continuous motion robotic device providing multiple robotic arms that is useful for a wide variety of different processing applications.

SUMMARY OF THE INVENTION

One aspect of the present invention relates to a continuous motion robotic device for processing objects. The system includes a first robotic arm, a second robotic arm, a third robotic arm, and a drive system. Each of the robotic arms includes an end effector for performing useful work on an object. Further, the robotic arms are coaxially arranged relative to one another. Finally, the drive system commonly controls the three robotic arms and defines a central axis about which the device rotates. With this configuration, the system is capable of high-speed operation in that the robotic arms are sequentially presented to various work environment stations via rotation about the central axis. Further, by commonly controlling the three robotic arms with the drive system, the robotic arms are optimally sized while affording consistent, controlled paths for each of the end effectors. In one preferred embodiment, each of the robotic arms is comprised of three primary links and three primary joints, thereby providing three degrees of freedom. In another preferred embodiment, each robotic arm includes at least a first primary joint and a second primary joint, with the first primary joints being coupled to one another and the second primary joints being coupled to one another. Alternatively, in another preferred embodiment, the primary joints are decoupled.

Another aspect of the present invention relates to a continuous motion robotic device for processing objects. The device includes a plurality of robotic arms and a drive system. Each of the plurality of robotic arms includes a first primary link, a first primary joint, a second primary link, a second primary joint, and an end effector. The first primary links are rotatable about the respective first primary joints. The second primary joint connects the second primary link to the first primary link. Finally, the end effector is provided to perform work on an object. With this construction in mind, each of the first primary links are continuously rotatable about a common axis via the base. Further, each of the first primary joints are coupled to one another, and each of the second primary joints are coupled to one another. Finally, the drive system controls the robotic arms. In particular, the drive system includes a first input and a second input. The first input commonly drives the first primary joints, whereas the second input commonly drives the second primary joints. With this configuration, then, a continuous motion robotic system is provided in which each of the robotic arms has at least two degrees of freedom.

Further, by coupling the first and second primary links, the end effectors are driven to trace the same path at the same time.

Yet another aspect of the present invention relates to a method of processing objects within a workspace. The method includes providing a continuous motion robotic device including three coaxially arranged robotic arms. Each of the arms has an end effector and extends radially from a hub defined by a drive system. Further, the drive system commonly drives the three robotic arms. Based upon the parameters of a first workspace, a first desired path for the end effectors is determined. The drive system is then configured to articulate the end effectors through the first desired path. The robotic device is positioned within the first workspace. Finally, the drive system is operated such that the end effectors pass through the first desired path to process objects within the first workspace. In one preferred embodiment, the method further includes determining a second desired path for the end effectors based upon parameters of a second workspace. The drive system is reconfigured so as to articulate the end effectors through the second desired path. The robotic device is positioned within the second workspace. Finally, the drive system is operated such that the end effectors pass through the second desired path to process objects within the second workspace.

DETAILED DESCRIPTION OF THE PREFERRED EMBODIMENTS

Figure 1A:
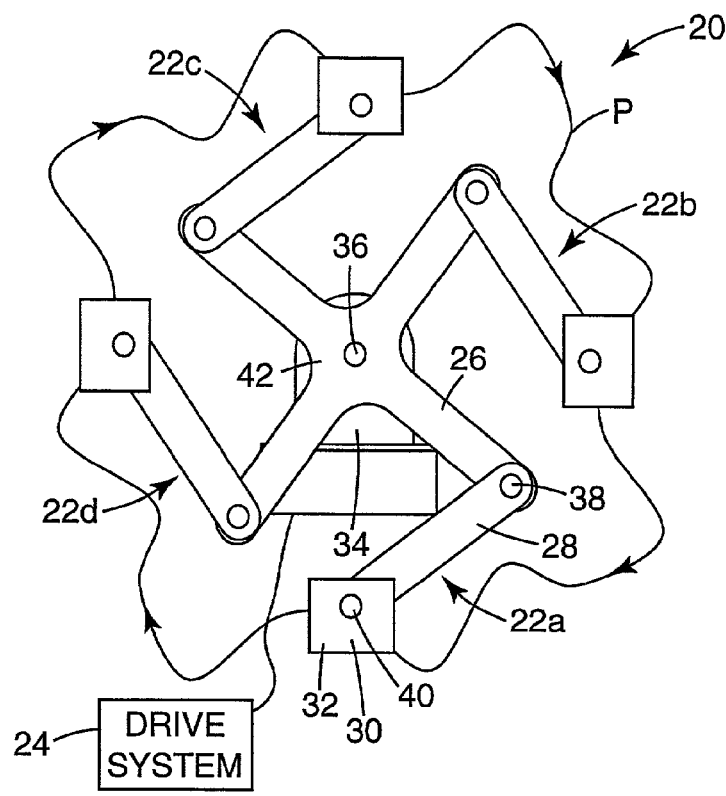
FIG. 1A is a simplified, top view of a continuous motion robotic device in accordance with the present invention incorporating coupled robotic arms.

The present invention relates to a continuous motion robotic device in which multiple, coaxially arranged robotic arms are commonly driven through a full 360 degrees of motion by a drive system. In this regard, and with respect to various preferred embodiments described below, the robotic arms can be coupled or decoupled relative to one another. With this in mind, FIG. 1A illustrates a coupled arrangement, whereas FIG. 1B relates to a decoupled configuration. In particular, FIG. 1A depicts, in highly simplified form, one preferred embodiment of a continuous motion robotic device 20. The device 20 includes a plurality of robotic arms 22a–22d and a drive system 24 (shown in block form). In the embodiment of FIG. 1A, each of the robotic arms 22a–22d are provided with three degrees of freedom and include a first primary link 26, a second primary link 28, and a third primary link 30. The third primary link 30 terminates in, or is connected to, an end effector 32 (shown generally in FIG. 1A). The end effector 32 is configured to perform work on an object (not shown). Regardless, the robotic arms 22a–22d are preferably identically constructed, and are rotatably connected to a base 34 by a first primary joint 36. Further, for each individual arm 22a–22d, the second primary link 28 is pivotably connected to the first primary link 26 by a second primary joint 38. Similarly, the third primary link 30 is pivotably connected to the second primary link 28 by a third primary joint 40. While the primary joints 36–40 have been illustrated as being rotary joints, other configurations are equally acceptable. For example, as described in greater detail below, one or more of the primary joints 36–40 can be sliding joints.

While each of the robotic arms 22a–22d has been illustrated as including three of the primary links 26–30, and thus three degrees of freedom, in an alternative embodiment, only two of the primary links are included such that robotic arms 22a–22d have two degrees of freedom. Conversely, four or more primary links can be provided for each of the arms 22a–22d. Even further, the additional link(s) and related joints can be fashioned to provide movement in the z-direction (i.e., into and/or out of the page of FIG. 1A).

The first primary links 26, and in particular the first primary joints 36, are rigidly coupled to one another by a hub 42 otherwise rotatably driven by the drive system 24. As described in greater detail below, the drive system 24 either rotatably drives the hub 42, or causes the first links 26 to rotate about the hub 42 at the first primary joints 36. With either arrangement, the first primary links 26, via the first primary joints 36, rotate about a center point of the hub 42, such that the robotic arms 22a–22d are coaxially aligned. Further, although not specifically illustrated in FIG. 1A, each of the second primary joints 38, and thus each of the second primary links 28, are connected or coupled to one another via the drive system 24. The third primary joints 40, and thus the third links 30, are also connected or coupled to one another by the drive system 24. As a result, the robotic arms 22a–22d, and in particular the respective primary joints 36–40, are characterized as being "coupled" to one another, whereby a "coupled joint" is in reference to the associated primary links sweeping the same angle during the same period in time.

Specific primary joint coupling techniques are provided below. In general terms, the respective primary joints 36–40 are directly connected to a coupling device; or the associated primary links 26–30 are directly connected to a coupling device, resulting in a "coupling" of the corresponding primary joints 36–40. Regardless of exact form, however, the rigidly connected first primary joints 36 are commonly driven by a single input (not shown) defined by the drive system 24. Similarly, the second primary joints 38 and the third primary joints 40 are also commonly driven by second and third inputs (not shown), respectively, defined by the drive system 24. With this configuration, then, the end effectors 32 are transmitted through, or trace, the substantially same path (designated as "P" in FIG. 1A) at the same time. As a result, the end effectors 32 are positioned at a substantially identical radial distance relative to a center point of the hub 46. Preferably, the paths and radial positions of the end effectors 32 are identical. However, expected machining tolerances, joint clearances and control system errors/deviations can slightly alter the paths and positions. As such, some minor fluctuation in path and radial position (relative to identical paths and position) is expected. Regardless, the speed of the end effectors 32 are preferably prescribed along the path, and as such can increase, decrease or even stop (dwell) for a brief period.

Notably, while the device 20 has been illustrated in FIG. 1A as including four of the robotic arms 22a–22d, any other number is equally acceptable. Regardless of the number of robotic arms 22a–22d, only three inputs are required of the drive system 24 for driving the robotic arms 22a–22d each having three degrees of freedom.

Figure 1B:
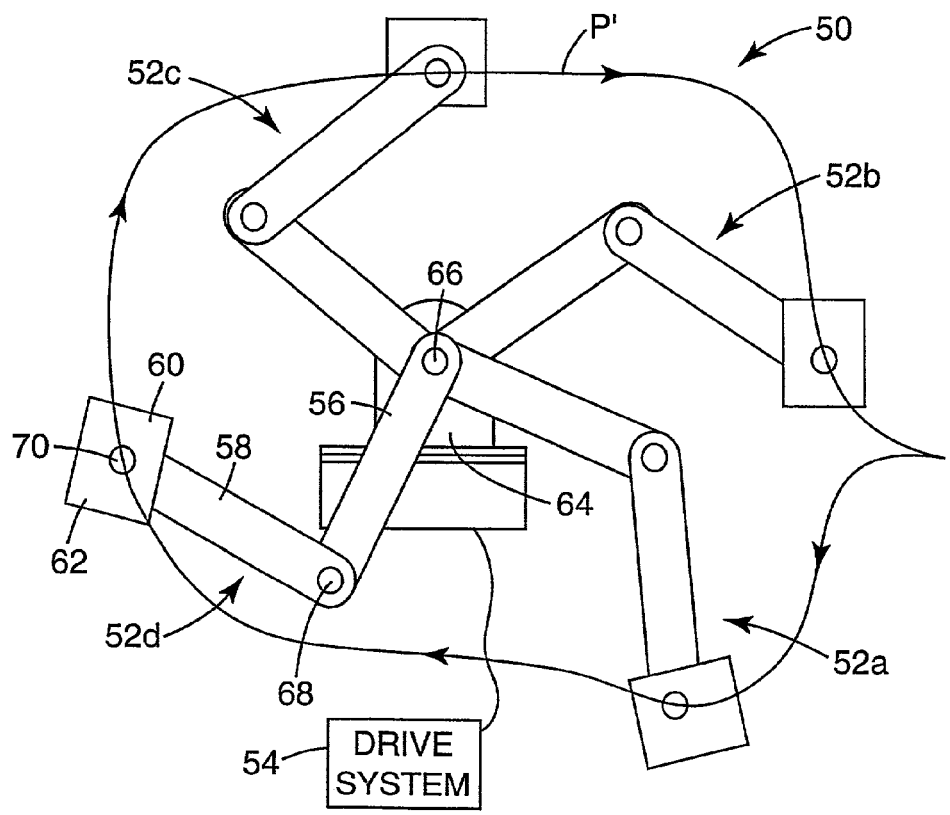
FIG. 1B is a simplified, top view of an alternative embodiment continuous motion robotic device in accordance with the present invention incorporating decoupled robotic arms.

The device 20 has been described with reference to coupled robotic arms 22a–22d. Alternatively, the robotic arms 22a–22d need not be coupled as described above, but instead can be essentially "decoupled". More particularly, FIG. 1B illustrates, in simplified form, an alternative embodiment, continuous motion robotic device 50. The device 50 includes identically constructed robotic arms 52a–52d and a drive system 54 (shown in block form). Each of the robotic arms 52a–52d are provided with three degrees of freedom, and thus include a first primary link 56, a second primary link 58, and a third primary link 60. The third primary link 60 terminates in, or is connected to, an end effector 62 configured to perform work on an object (not shown). Each of the first primary links 56 are connected to a base 64 at a first primary joint 66. Further, for each of the arms 52a–52d, the second primary link 58 is connected, preferably rotatably connected, to the first primary link 56 by a second primary joint 68; and a third primary joint 70 connects, preferably rotatably connects, the third primary link 60 to the second primary link 58. Once again, more or less than four of the robotic arms 52a–52d can be provided, and each arm 52a–52d can have more or less than three degrees of freedom.

As described in specific embodiments below, the drive system 54 includes three inputs that commonly drive each of the primary links 56–60, respectively. In this regard, the drive system 54 rotates the first primary links 56 about a common center point (via the first primary joints 66) such that the arms 52a–52d are coaxially aligned. In contrast to the device 20 (FIG. 1A), however, the respective primary links 56–60 and the primary joints 66–70 for each of the arms 52a–52d are essentially decoupled from one another. With this configuration, each of the end effectors 62 traces substantially the same path (designated as "P'" in FIG. 1B), but the arms 52a–52d do not do the same thing at the same point in time. In other words, each of the robotic arms 52a–52d generates substantially the same motion at substantially the same point of the path P'. In other words, the robotic arms 52a–52d are directed through substantially identical paths (relative to inherent machining tolerances, joint clearance and control system error factors), and the respective end effectors 62 are positioned at different radial distances relative to a center point during at least one period in time. Thus, the robotic arms 52a–52d are evenly distributed in time, but not in space. As a result, the robotic arms 52a–52d may then get closer or farther from each other during rotation thereof depending upon the particular path P'. Notably, the decoupled path P' can be chosen to vary over a complete 360 degree rotation. In contrast, the coupled path P (FIG. 1A) can only be chosen for 360/n where n, equals the number of robotic arms. Further, as compared to the coupled path P, the decoupled path P' can be chosen with no redundant motions and will generally be much smoother and faster than the coupled path P. Finally, similar to the coupled path P, the decoupled path P' can prescribe the speed of the end effectors 62 at every point such that the end effectors 62 can travel faster, slower, or even stop (dwell) for some time at any spatial point.

Figure 1C:
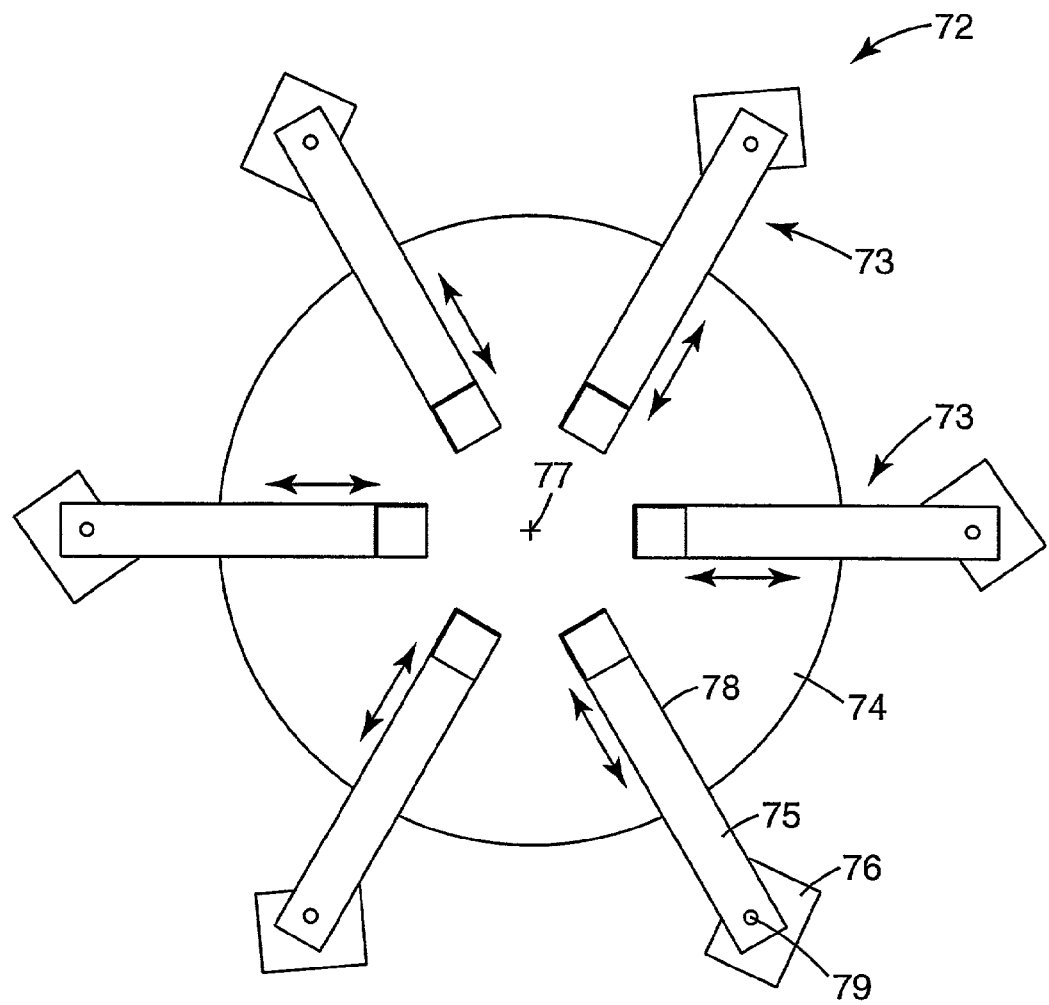
FIG. 1C is a simplified, top view of a continuous motion robotic device in accordance with the present invention incorporating robotic arms with sliding joints.

The various primary joints associated with the devices 20, 50 have been illustrated as being rotary joints. Alternatively, as FIG. 1C depicts, in simplified form, a continuous motion robotic device 72 having a plurality of robotic arms 73 each incorporating a sliding joint. More particularly, each of the arms 73 includes a first primary link 74 (shown generally, but integrally formed as part of a hub), a second primary link 75, and a third primary link 76. The first primary links 74 rotate about a first primary joint 77. The second primary joints 78 are sliding joints. Finally, the third primary links 76 are rotatably connected to respective ones of the second primary links 75 by a third primary joint 79. Alternatively or in addition, the third primary joints 79 can be sliding joints. Even further, one or more of the joints 77, 78, 79 can be prismatic joints.

As described below, the inventive continuous motion robotic devices 20, 50 can be effectuated with a variety of different drive system configurations. In this regard, two basic constructions of the drive system 24, 54 are available. In one preferred embodiment, the drive system 24, 54 is servo-motor based. Servo-motors are well known in the art and can be implemented as described. Alternatively, the drive system 24, 54 can be mechanical in nature. More particularly, the drive system 24, 54 can include one or more specifically designed cam mechanisms. With this in mind, each of the following alternative embodiments are first described without reference to a specific drive system technique, it being understood, however, that a drive system of some type must be included and will either be servo-motor based or mechanically based. Also, it should be noted that in each of the following embodiments, the number of robotic arms, and the degrees of freedom provided for each arm, are merely exemplary. Finally, in each of the various embodiments, as well as in the descriptions of FIGS. 1A and 1B, reference to "end effectors" is made in general terms. As will be apparent to one of ordinary skill, "end effectors" can assume a wide variety of forms capable of performing some type of work on an object. For example, the end effectors can be vacuum suction cups, mechanical grippers, spray heads, etc. With any one type of end effector, it will be understood that additional components, mechanisms, etc., may be required, but are not shown.

Figure 2:
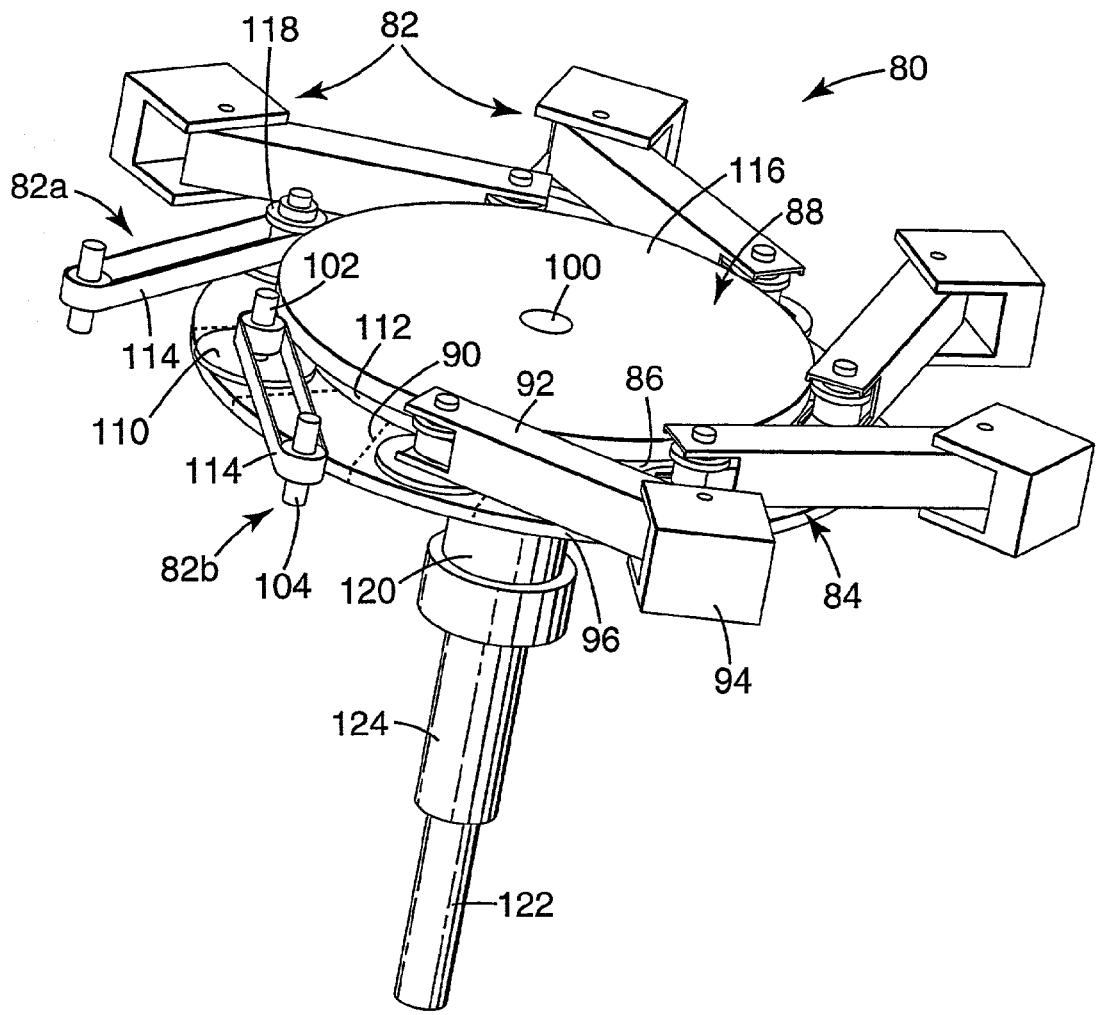
FIG. 2 is a perspective view of a first embodiment, continuous motion robotic device in accordance with the present invention including coupled robotic arms.

A first preferred embodiment of a coupled continuous motion robotic device 80 is shown in FIG. 2. The device 80 includes a plurality of robotic arms 82 and a drive system 83 a portion of which is illustrated as having a first input 84, second input 86, and a third input 88. To better illustrate various components, portions of the robotic arms 82a and 82b have been removed from the view of FIG. 2. With this in mind, each of the robotic arms 82 includes a first primary link 90 (shown generally as a portion of the first input 84), a second primary link 92, and a third primary link 94. Each of the third primary links 94 serves as an end effector (shown generally in FIG. 2). With this configuration, each of the robotic arms 82 is provided with three degrees of freedom.

Each of the first primary links 90 effectively is formed by a hub 96 otherwise defined by the first input 84. As described below, the hub 96 is rotatable about a central axis A, such that a common, coupled first joint 100 is defined for each of the first primary links 90. To better illustrate the first primary links 90, FIG. 2 includes phantom lines designating individual, imaginary links formed along the hub 96, it being understood that the hub 96 is, in reality, a continuous structure that rigidly forms the first primary links 90. Each of the second primary links 92 is rotatably connected to a respective one of the first primary links 90 by a second primary joint 102. Similarly, each of the third primary links 94 is rotatably connected to a respective one of the second primary links 92 by a third primary joint 104.

As previously described, the first input 84 forms the hub 96 to which the first primary links 90 are rigidly formed or otherwise connected. Similarly, the second input 86 forms a master gear 112 that couples, and thus commonly drives motion of, each of the second primary joints 102, and thus each of the second primary links 92. In this regard, interaction between the master gear 112 and the secondary primary joints 102 can be frictional, or the respective components 92, 112 can be formed to include interlocking teeth, such as by a plurality of small gears 110 that are otherwise rigidly attached to a respective second primary link 92. Finally, in one preferred embodiment, a plurality of pulley belts 114 are provided, respective ones of which extend through a central portion of one of the second primary links 92, and are connected to one of the third primary joints 104, respectively. Further, the third input 88 forms a hub or gear 116 that commonly engages each of the pulley belts 114, such as by a plurality of small gear 118 that are otherwise rigidly attached to a respective pulley belt 114. Thus, the third input 88, via the gears 116, couples the third primary joints 104, and thus, commonly drives the third primary links 94.

Each of the robotic arms 82, and in particular the first primary joints 100, are coaxially positioned about the central axis A. Further, each of the inputs 84–88 rotate about the central axis A. To this end, the inputs 84–88 include a coaxially-arranged shafts 120–124, respectively. With this configuration, each of the first primary joints 100 are coupled to one another by the first input 84, and in particular the hub 116. Similarly, each of the second primary joints 102 are coupled to one another via the second input 86, and in particular the master gear 112. Finally, each of the third primary joints 104 are coupled to one another by the third input 88, and in particular the gear 116. Thus, rotation of the first input 84 causes each of the first primary links 90, via the first primary joints 100, to rotate in an identical fashion. Similarly, rotation of the second input 86 drives each of the second primary links 92, via the second primary joints 102, through an identical motion. Finally, rotation of the third input 88 drives each of the third primary links 94, via the third primary joints 104, through an identical motion via the pulley belts 114.

Figure 3:
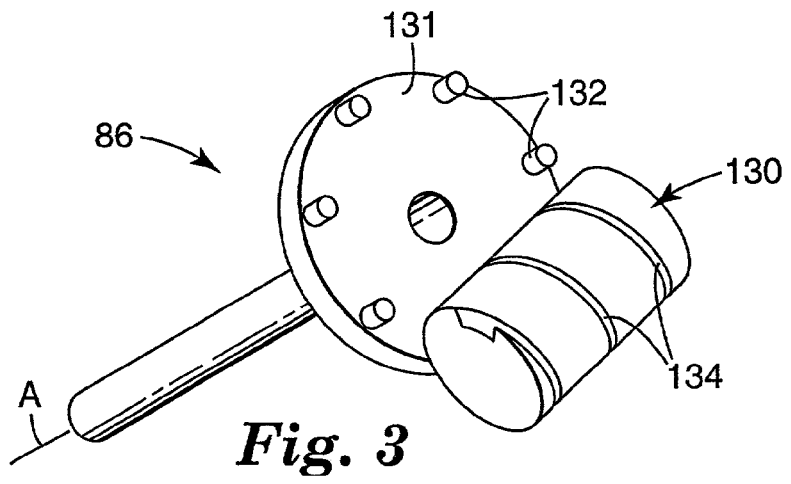
FIG. 3 is a perspective view of a mechanical-based drive mechanism for the device of FIG. 2.

The drive system 83 requires only three of the inputs 84–88 to drive all of the robotic arms 82 (each having three degrees of freedom). In one preferred embodiment, the drive system 83 is comprised of three servo-motors driving respective ones of the shafts 120–124. Alternatively, the drive system can incorporate a cam-based configuration, one example of which is shown in FIG. 3. In particular, FIG. 3 illustrates the second input 86 and a barrel cam 130. The second input 86 includes a plate 131 and a plurality of circumferentially spaced followers 132. As a point of reference, the plate 131 is secured to the shaft 122 opposite the master gear 112 (FIG. 2). The followers 132 are sized to fit within, and be driven by, a cam path or slot 134 formed in an exterior of the barrel cam 130. Thus, rotation of the barrel cam 130, such as by a motor (not shown), causes the plate 131 to rotate about the central axis A via interaction of the followers 132 within the cam path 134. This rotation is translated to the master gear 112 via the shaft 122, and applied to the second primary joints 102 (FIG. 2) via the gears 110 (FIG. 2). Notably, additional barrel cams and plates are provided for each of the first input 84 and the third input 88, respectively. The various cam paths 134 formed by the three barrel cams 130 can be identical or different, and can assume a wide variety of configurations (or axial spacings). Further, one or more of the cam paths 134 can approximate a dwell for the respective input 84–88.

Figure 4A:
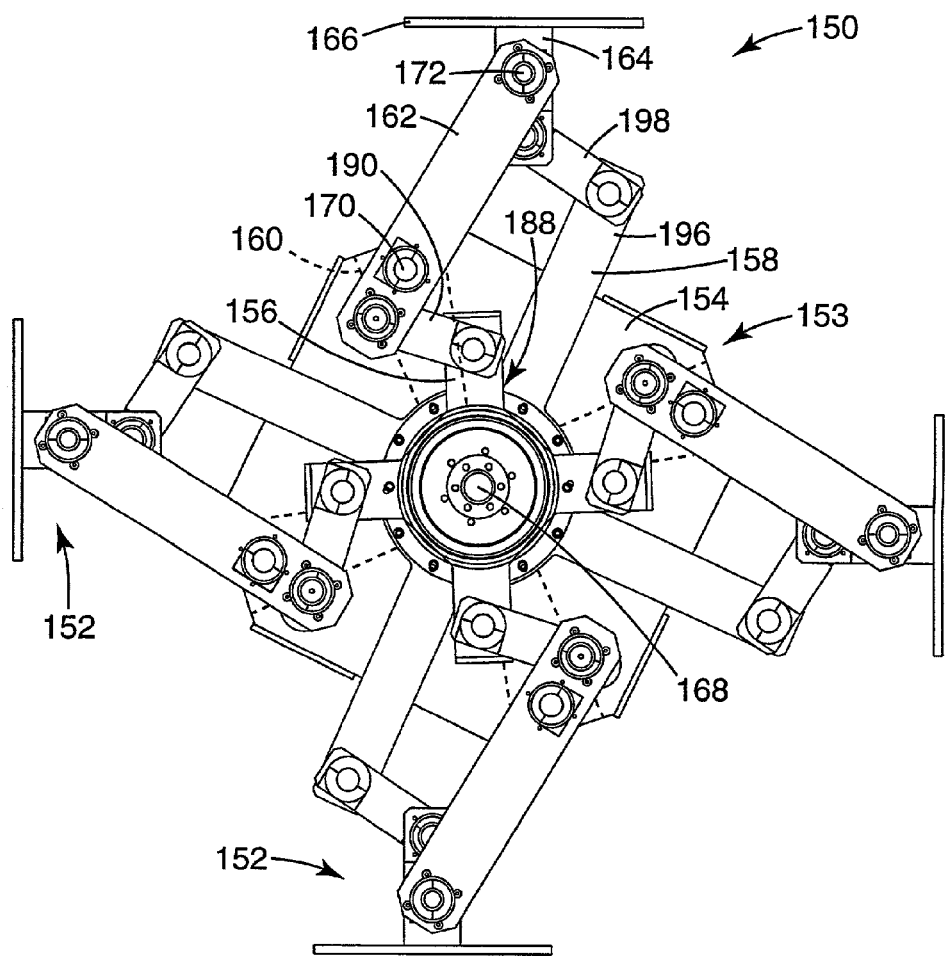
FIG. 4A is a top view of a second embodiment, continuous motion robotic device in accordance with the present invention including coupled robotic arms.
Figure 4B:
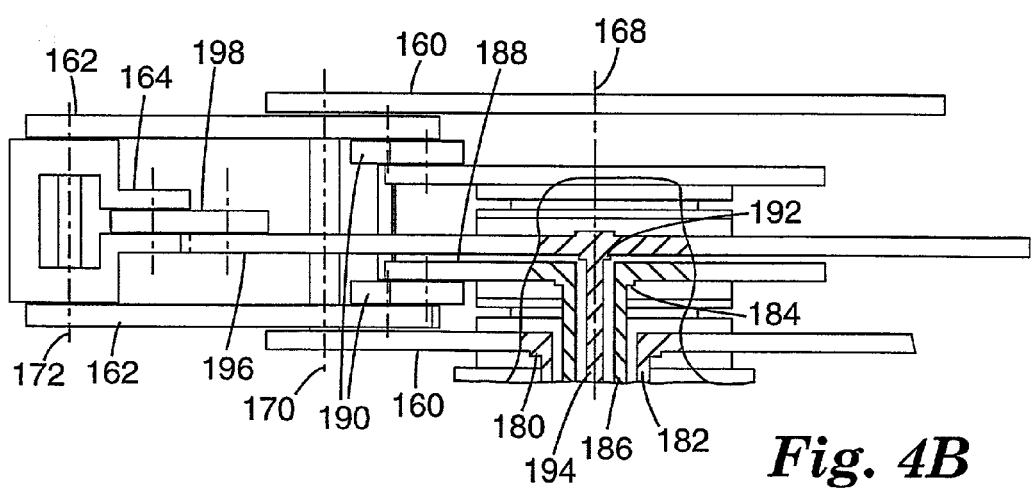
FIG. 4B is a simplified, side-sectional view of the device of FIG. 4A.

An alternative embodiment coupled continuous motion robotic device 150 is shown in FIGS. 4A and 4B. In general terms, the device 150 includes a plurality of robotic arms 152 and a drive system 153 a portion of which is shown including a first input 154, a second input 156, and a third input 158. Each of the robotic arms 152 is preferably provided with three degrees of freedom and includes a first primary link 160, a second primary link 162, and a third primary link 164, with the third primary link 164 terminating in, or forming, an end effector 166. As with the device 80 (FIG. 2) previously described, each of the first primary links 160 are integrally formed as part of the first input 154, and therefore do not exist as visually discernable parts (in the preferred embodiment). To better illustrate the first primary links 160, however, phantom lines have been drawn into the relevant portion of the first input 154 to provide a visual representation of the components 160. With this in mind, each of the first primary links 160 are coupled to the first input 154 at a first primary joint 168. As described below, the first input 154 is rotatable, such that the first primary joints 168 are rotary joints, and are rigidly coupled to one another. Each of the first primary links 160 are connected to respective ones of the second primary links 162 by a second primary joint 170, respectively. Finally, for each robotic arm 152, the second primary link 162 is rotatably connected to the third primary link by a third primary joint 172, respectively. Thus, in one preferred embodiment, each of the robotic arms 152 has three degrees of freedom.

Each of the robotic arms 152, and in particular the first primary joints 168, are coaxially positioned relative to one another, and are rotatable about a common axis B, via the first input 154. In this regard, and as best shown in FIG. 4B, the first input 154 includes a drive hub 180 and a central shaft 182. The drive hub 180 of the first input 154 integrally forms or defines each of the first primary links 160, and rigidly couples each of the first primary joints 168. Similarly, the second input 156 includes a drive hub 184 and a central shaft 186. The drive hub 184 of the second input 156 is connected, and rotatably drives, each of the second primary joints 170. In one preferred embodiment, a first extension arm 188 and a first secondary link 190 are provided for each of the robotic arms 152, connecting the drive hub 184 to the second primary joint 170, respectively. The first extension arm 188 is formed as a rigid extension of the drive hub 184, whereas the first secondary link 190 connects the first extension arm 188 and the second primary link 162. Finally, the third input 158 includes a drive hub 192 and a central shaft 194. The drive hub 192 is connected to, and rotatably drives, each of the third primary joints 172. In this regard, a second extension arm 196 and a second secondary link 198 are, in one preferred embodiment, provided for each of the robotic arms 152, connecting the drive hub 192 to the third primary joint 172, respectively. The second extension arm 196 is formed as a rigid extension of the drive hub 192, whereas the second secondary link 198 is connected to the second extension arm 196 and the third primary link 164. Thus, the drive hub 192 drives the third primary joints 172 via the second extension arm 196, the second secondary link 198, and the third primary link 164. Finally, as shown in FIG. 4B, the central shafts 182, 186, and 194 are coaxially arranged (similar to the device 80 of FIG. 2). With this configuration, regardless of the exact number of robotic arms 152, only three inputs 154–158 are required, yet each of the arms 152 is provided with three degrees of freedom.

Once again, the first input 154, and in particular the drive hub 180, rigidly couples the first primary joints 168. Thus, the first input 154 commonly drives movement of each of the first primary joints 168 and the first primary links 160. The second input 156, and in particular the drive hub 184, couples each of the second primary joints 170 via the respective first and second secondary links 188, 190. Notably, other connection designs are available for connecting the second primary joints 170 to the drive hub 184. Regardless, the second input 156 commonly drives movement of each of the second primary joints 170 and the second primary links 162. Finally, the third input 158, and in particular the drive hub 192, couples each of the third primary joints 172 via the respective third and fourth secondary links 196, 198. Notably, other connection techniques for connecting the third primary joints 172 to the drive hub 192 are equally acceptable. Regardless, the third input 158 commonly drives movement of each of the third primary joints 172 and the third primary links 164.

In addition to the inputs 154–158, the drive system 153 associated with the device 150 can assume a variety of forms. In one preferred embodiment, the drive system 153 further includes three servo-motors, as known in the art, rotatably driving the central shafts 182, 186, 194, respectively. Alternatively, the drive system can be cam-based, utilizing three barrel cams; one for each of the inputs 154–158, respectively. In this regard, the cam-based configuration can be similar to that shown in FIG. 3.

Figure 5A:
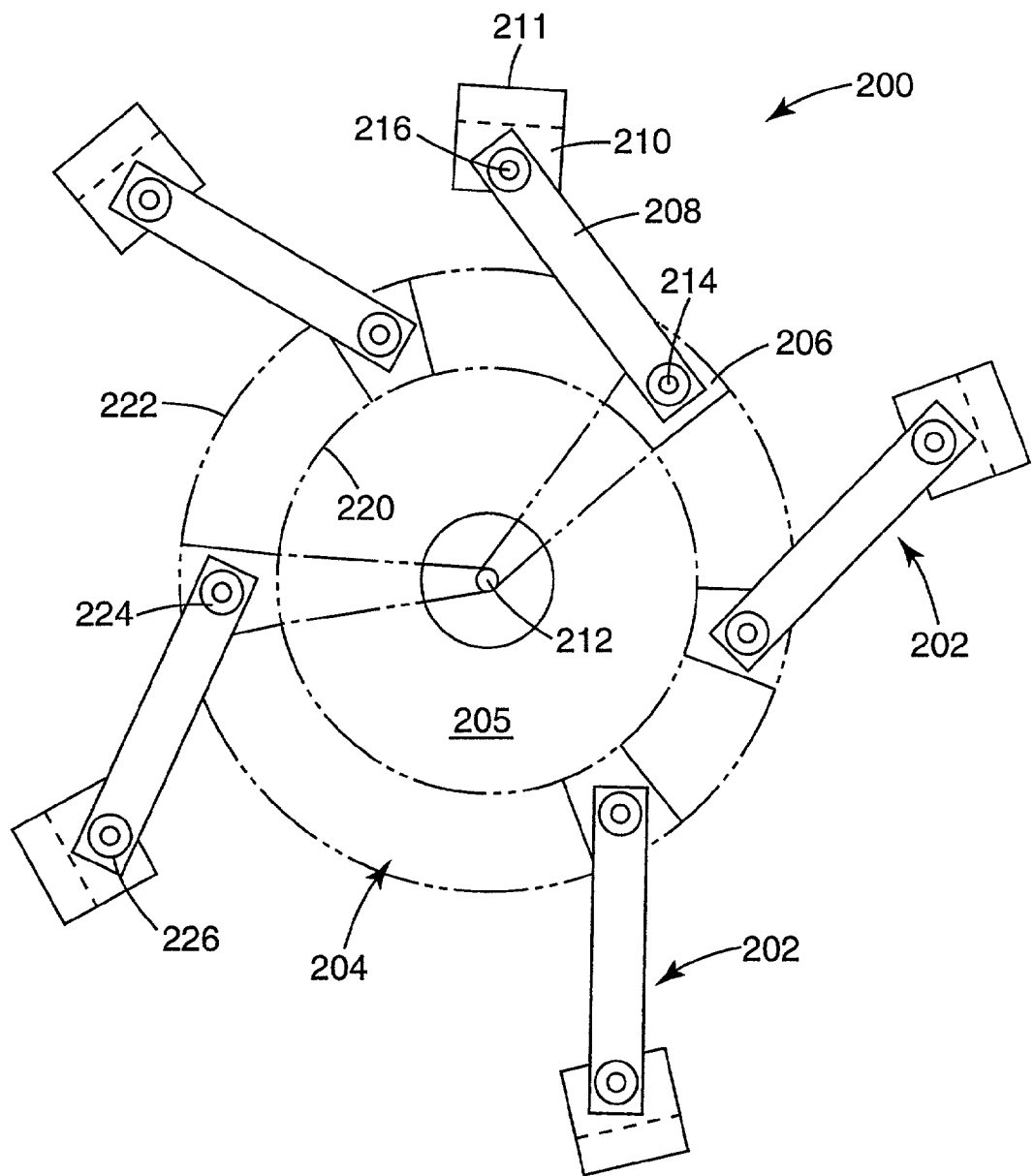
FIG. 5A is a top view of a third embodiment, continuous motion robotic device in accordance with the present invention including decoupled robotic arms.

The above-described continuous motion robotic devices 80 and 150 inherently couple respective links or joints of the various robotic arms. Alternatively, the robotic arms can be decoupled. An example of such a device is shown generally at 200 in FIG. 5A. The device 200 includes a plurality of robotic arms 202 and a closed loop track 204. As described in greater detail below, the track 204 serves as one or more inputs of a drive system (shown generally in FIG. 5A) for driving the robotic arms 202. Regardless, each of the robotic arms includes a first primary link 206, a second primary link 208, and a third primary link 210 forming or maintaining an end effector 211. In the embodiment of FIG. 5A, the first primary link 206 is a cart secured to, and moveable along, the track 204. Thus, each of the first primary links 206 are rotatable about a center point defined by the track 204. Effectively, then, each of the first primary links 206 are connected to the drive system 205 by a first primary joint 212 otherwise defined at an instant center of the track 204. To better illustrate a relationship between the first primary links 206 and the respective first primary joints 212, an extension of two of the first primary links 206 is shown in phantom in FIG. 5A. Once again, the phantom lines associated with exemplary first primary link 206, as well as the first primary joints 212, do not physically exist; instead they are represented in FIG. 5 to better illustrate the rotational point of each of the first primary links 206. The second primary links 208 are rotatably connected to the first primary links 206 by second primary joints 214, respectively. Finally, the third primary links 210 are rotatably connected to the second primary links 208 by third primary joints 216, respectively.

The track 204 is preferably circular, defining a single centerpoint. Alternatively, however, the track 204 can assume a wide variety of other shapes. Where the track 204 is something other than circular, the track 204 effectively defines a plurality of instant centers (relative to a location of a particular cart at a specific point in time). Thus, for a non-circular track, a number of different center points (or point of rotation for the first primary links 206) exist. The particular center point depends on the location of the cart and thus the specific instant center being encountered.

The track 204 includes an inner guide 220 and an outer guide 222 (shown generally in FIG. 5A). At least the first primary links or carts 206 are moveably nested between the inner and outer guides 220, 222. Various techniques for driving the first primary links or carts 206, as well as other components and alternative embodiments are provided below. In general terms, however, each of the first primary links or carts 206 is moveable about the path defined by the track 204. With this configuration, then, the track 204 serves as a first input for the first primary links or carts 206. The drive system 205 further provides a second input 224 for each of the second primary joints 214. While the second inputs 224 can be configured to drive movement of each of the second primary joints 214, thus, the second primary links 208, in an identical fashion, the second primary joints 214 are not coupled to one another by the second inputs 224. That is to say, the second inputs 224 are independently drivable such that use of the second primary joints 214, and thus each of the second primary links 208, are passed through different angles at the same point in time. Similarly, the drive system 205 provides a third input 226 for each of the third primary joints 216. As with the second inputs 224, the third inputs 226 are independent of one another such that the third primary joints 216, and thus the third primary links 210, are not coupled to one another.

Figure 5B:
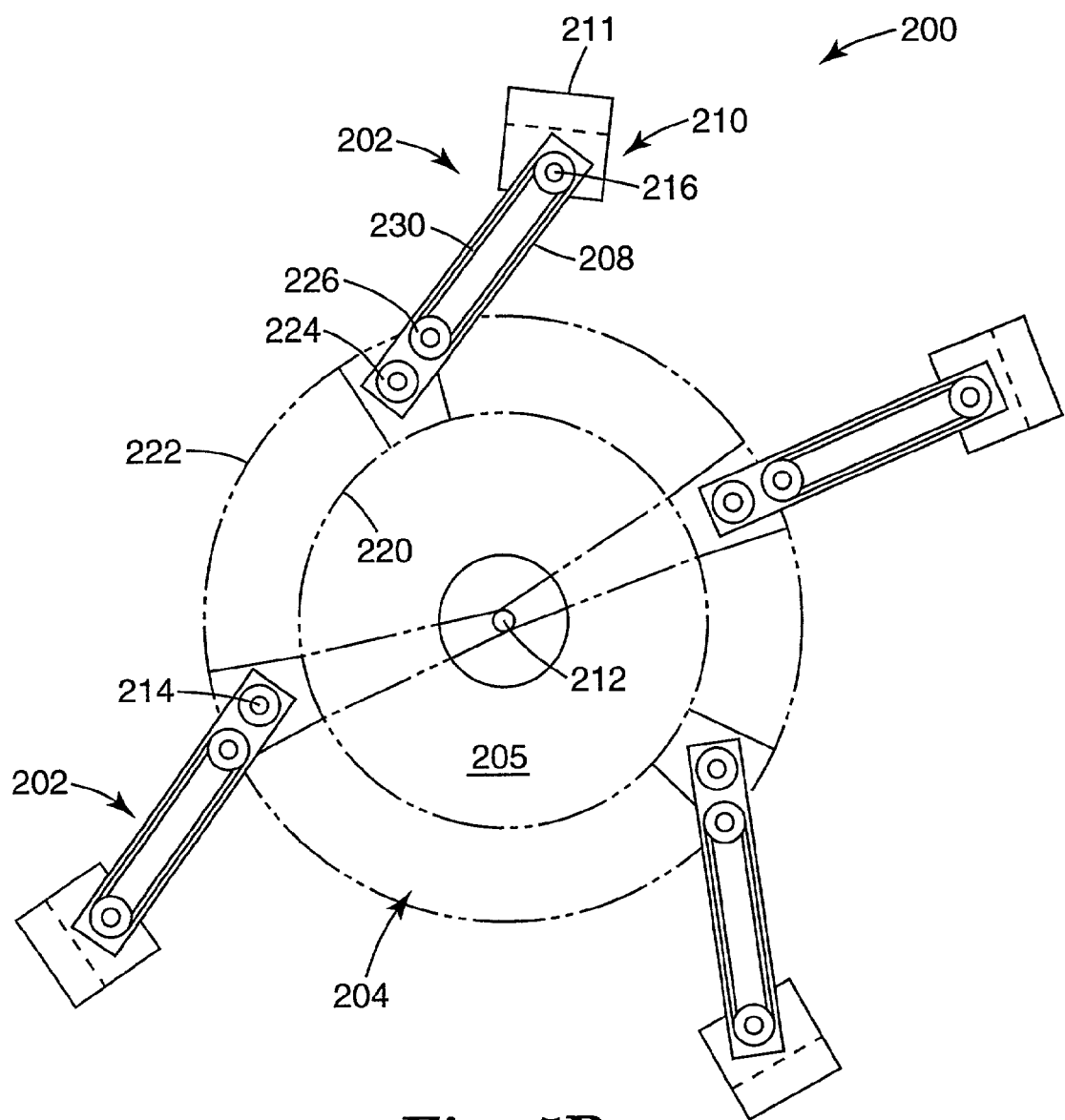
FIG. 5B is a top view of a fourth embodiment, continuous motion robotic device.

In the one embodiment of FIG. 5A, each of the second and third inputs 224, 226 are servo-motors driving the respective second and third primary joints 214, 216. This configuration provides optimal flexibility of motion and is kinematically simple, such that the drive system 205 is easy to program and control. Alternatively, and as shown in FIG. 5B, each of the robotic arms 202 can be provided with a pulley belt 230 extending from the third primary joint 216 within the second primary link 208. With this embodiment, the servo-motors serving as the third inputs 226 are moved inwardly from the third primary joints 216, yet control movement thereof via the respective pulley belts 230. Thus, the potential cantilever concerns presented by a placement of a servo-motor on the third primary links 210 is alleviated. In fact, the servo-motor could be moved to the opposite side of the second primary joint 214 to assist in counter balancing the mass of the respective end effector 211.

Figure 5C:
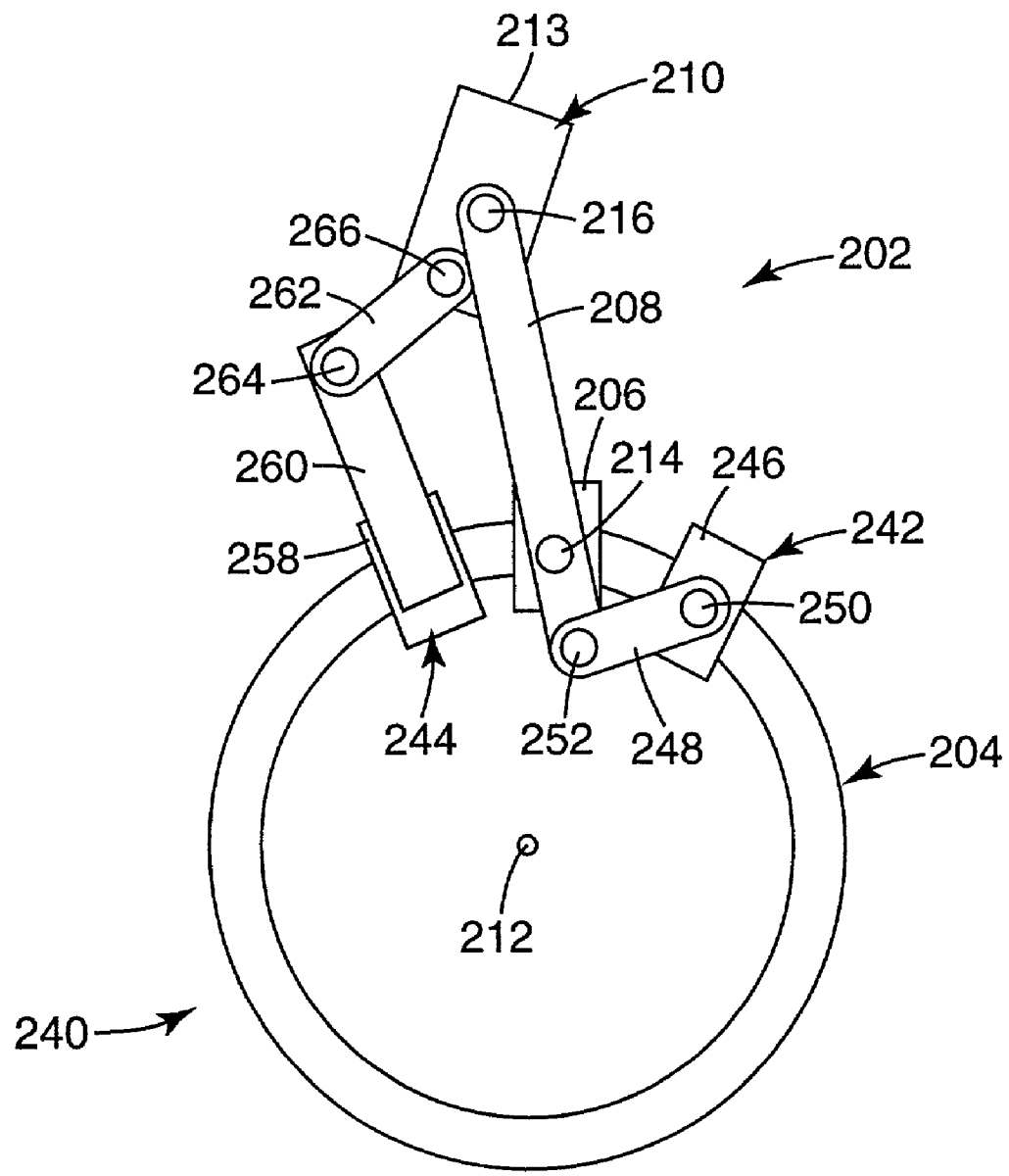
FIG. 5C is a top view of a fifth embodiment, continuous motion robotic device.

Alternatively, the second and third inputs 224, 226, need not be servo-motors, but instead can be formed as part of the drive system provided by the track 204. In this regard, FIG. 5C illustrates an alternative continuous motion decoupled robotic device 240. As a point of reference, FIG. 5C illustrates only one of the robotic arms 202 and a schematic illustration of the track 204. Once again, the robotic arm 202 includes the first primary link or cart 206, the second primary link 208, the third primary link 210, the first primary joint 212, the second primary joint 214, and the third primary joint 216. The first primary link 206 serves as the first input to the first primary joint 212 via the track 204. In addition, the device 240 includes a second input 242 and a third input 244. The second input 242 includes a drive cart 246 and a coupler link 248. The drive cart 246 is moveably coupled to, and drivable about, the track 204 as described in greater detail below. The coupler link 248 is rotatably connected to the drive cart 246 by a first secondary joint 250; and rotatably coupled to the second primary link 208 by a second secondary joint 252. Thus, the drive cart 246 drives the second primary joint 214 via the coupler link 248 and the second primary link 208.

The third input 244 includes a drive cart 258, a drive link 260, and a coupler link 262. The drive cart 258 is moveably mounted to the circular track 204 as described below. The drive link 260 is rigidly attached to, and extends from, the drive cart 258. The coupler link 262 is rotatably connected to the drive link 260 by a first secondary joint 264; and the third primary link 210 by a second secondary joint 266. With this configuration, movement of the drive cart 258 is translated to the third primary joint 216 via the drive link 260, the coupler link 262 and the third primary link 210.

Though not shown, additional, similarly-constructed arms 202 and inputs are connected to the track 204. During use, the carts 206, 246, 258 associated with each arm 202 are articulated about the circular track 204 in a desired fashion. The carts 206, 246, 258 can be moved identically or differently, such that an arc length spacing between each of the carts 206, 246, 258 can vary during a full 360-degree rotation of the respective robotic arm 202. With this configuration, then, the drive system 205 dictates a desired spatial position and orientation of the end effector 213. Notably, with the embodiment of FIGS. 5A–5C, each of the robotic arms 202, and in particular the end effectors 213, are coplanar.

Figure 6A:
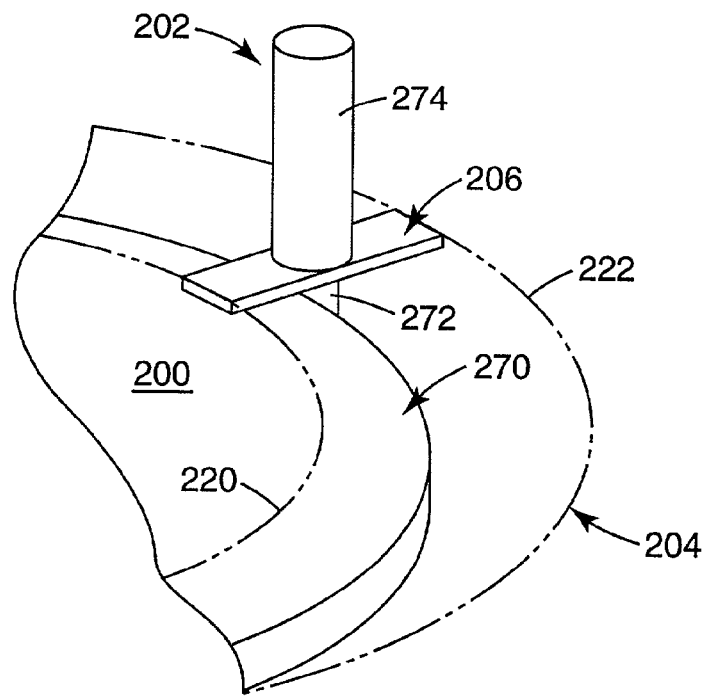
FIG. 6A is an enlarged perspective view of a portion of a drive system useful with the devices of FIGS. 5A–5C.
Figure 6B:
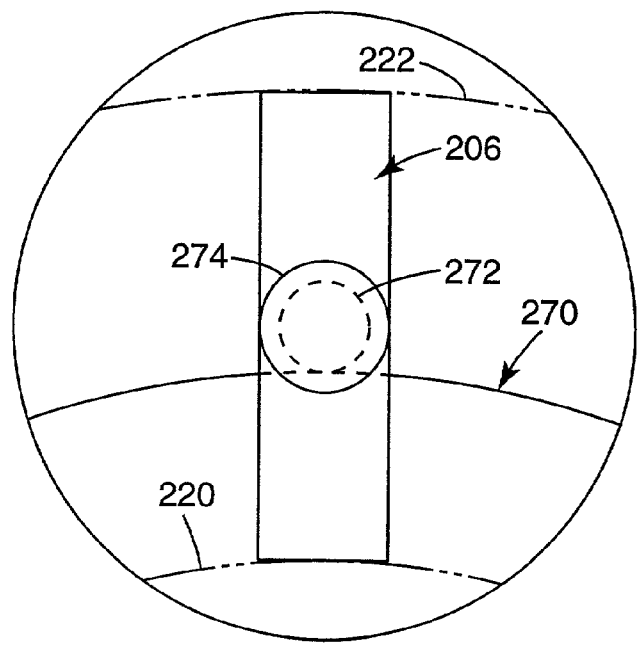
FIG. 6B is an enlarged, bottom view of a portion of the drive system of FIG. 6A.

The embodiments illustrated in FIGS. 5A–5C are but three examples of acceptable configurations of the robotic arms 202 relative to the track 204. That is to say, other secondary connecting approaches are equally acceptable. Regardless of the exact design, however, at least one cart (such as the first primary link 206) is moveably mounted to, and drivable about, the track 204. One preferred mounting and driving technique is illustrated schematically in FIGS. 6A and 6B. As a point of reference, FIG. 6A depicts a portion of the circular track 204 and a portion of one of the robotic arms 202. FIG. 6B depicts an enlarged portion of the track 204 and the cart of one arm 202. Once again, the track 204 includes the inner guide 220 and the outer guide 222. The first primary link or cart 206 is nested between the inner and outer guides 220, 222. Further, a stationary gear 270 (shown generally in FIGS. 6A and 6B) extends radially outwardly relative to the inner guide 220. Further, the first primary link or cart 206 is provided with a drive gear 272 and a servomotor 274 (shown schematically). The gears 270, 272 are formed with intermeshing teeth (not shown), with the servo-motor 274 dictating rotation of the drive gear 272. The outer guide 222 constrains the first primary link or cart 206 such that the stationary gear 272 does not disengage the stationary gear 270. With this configuration, then, activation of the servo-motor 274 causes the drive gear 272 to rotate against the stationary gear 270. This action, in combination with the constraining force presented by the outer guide 222 causes the first primary link or cart 206 to move about the track 204. Notably, this configuration can be provided for only the first primary link or cart 206 (such as in FIGS. 5A and 5B), or for three different carts per each robotic arm (such as with the configuration of FIG. 5C).

Figure 7A:
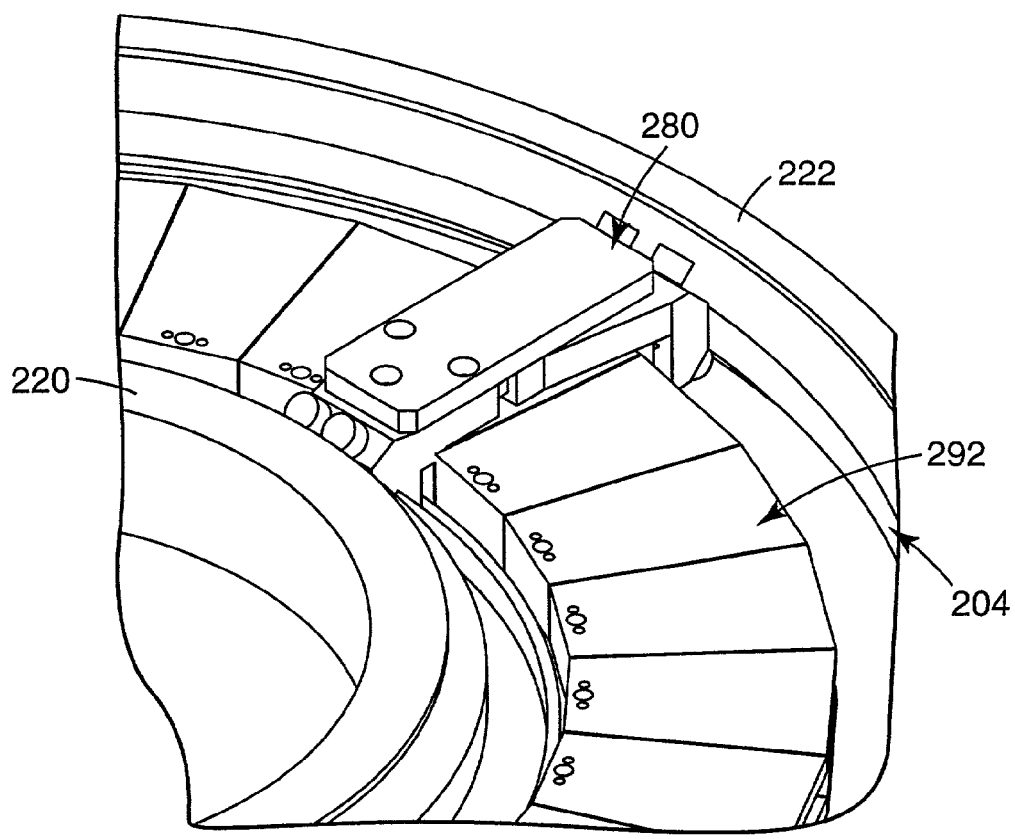
FIG. 7A is an enlarged perspective view of a portion of an alternative drive system useful with the devices of FIGS. 5A–5C.
Figure 7B:
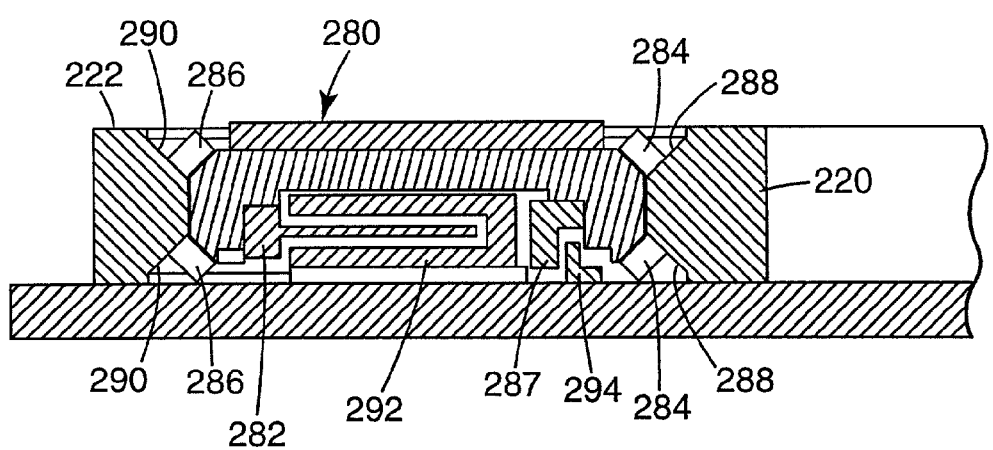
FIG. 7B is a cross-sectional view of a portion of FIG. 7A.
Figure 7C:
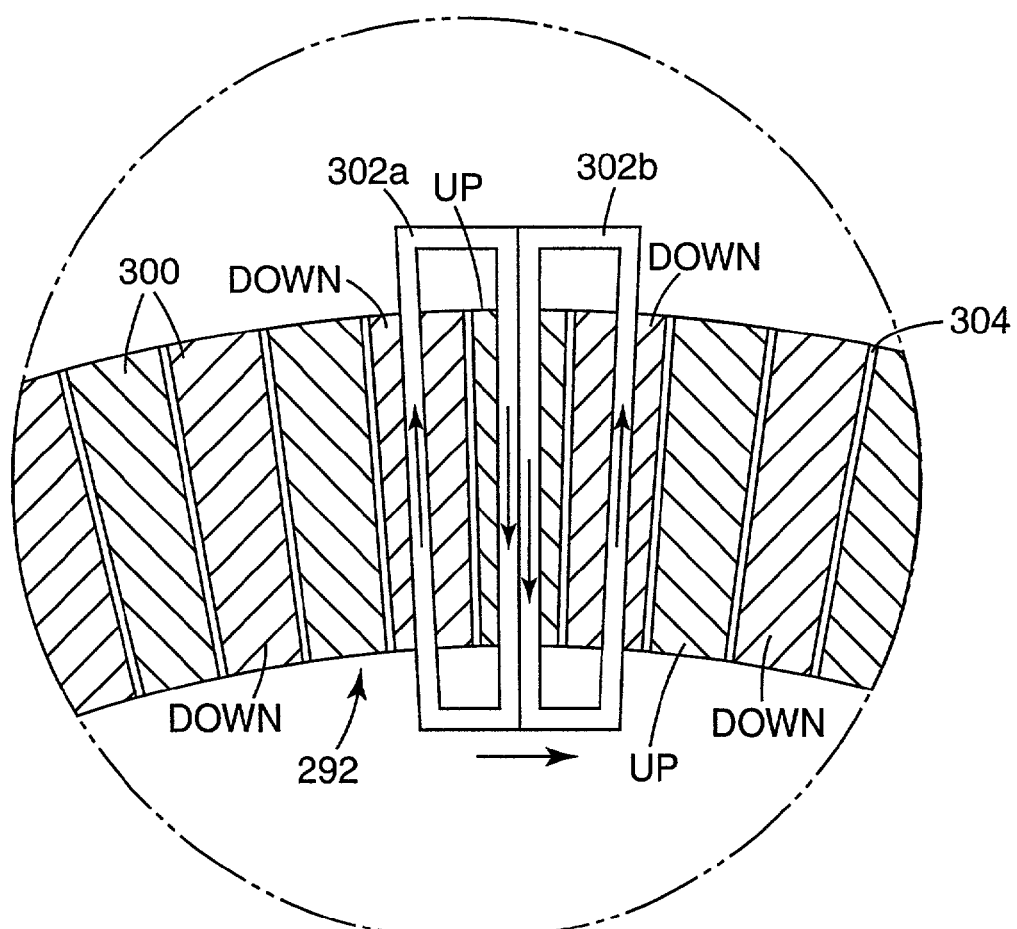
FIG. 7C is an enlarged, schematic illustration of a portion of the drive system of FIG. 7A.

An alternative approach for mounting and driving one or more carts about the track 204 is illustrated in FIGS. 7A–7C. In general terms, the embodiment of FIGS. 7A–7C entails use of a linear motor to drive the respective parts (such as the first primary link or cart 206) about the curved track 204. With this in mind, FIG. 7A illustrates a portion of the track 204, a tooling cart 280 and a magnet system 292. The track 204 includes the inner guide 220 and the outer guide 222. The tooling cart 280 (analogous to the first primary link or cart 206 of FIG. 5A) is nested between, and drivable about, the inner and outer guides 220, 222. Finally, the magnet system 292 is positioned below the tooling cart 280.

With further reference to FIG. 7B, the cart 280 is connected to a linear motor 282 and further includes opposing inner wheels 284, opposing outer wheels 286, and, in one preferred embodiment, an encoder sensor 287. The inner guide 220 forms guide surfaces 288 configured to receive the opposing inner wheels 284. Similarly, the outer guide 222 forms surfaces 290 configured to receive the opposing outer wheels 286. Further, the magnet system 292 extends between the inner and outer guides 220, 222, and is configured to drive the linear motor 282, as described in greater detail below. Finally, an encoder scale 294 extends in a circular fashion adjacent the inner guide 220, and is configured to interact with the encoder sensor 287 associated with the cart 280. Although not illustrated in the various figures, it will be understood that appropriate electrical connections and controllers are provided for each of the linear motors 282, the encoder sensor 287, the magnet system 292, and the encoder scale 294. With this configuration, then, the linear motor 282 is driven, via the magnet system 292 about the circular track 204 with the inner and outer wheels 284, 286 riding along the respective surfaces 288, 290.

FIG. 7C provides an enlarged, top view of a portion of the magnet system 292. In general terms, the magnet system 292 is comprised of a plurality of magnets 300 arranged in an arc-like fashion. FIG. 7C further illustrates coils 302$a$, 302$b$ associated with the linear motor 282 of FIGS. 7A and 7B. Current direction within each of the coils 302$a$, 302$b$ is illustrated with arrows. The magnetic flux direction alternates from up to down with alternate magnets 300 (as shown in FIG. 7C). In a preferred embodiment, each of the magnets 300 are wedge-shaped, having a slightly greater width adjacent the outer guide 222 (as compared to a width adjacent the inner guide 220). With this one preferred configuration, then, uniform gaps 304 are defined between adjacent magnets 300. Current flowing through the coils 302a, 302b cuts through the magnetic field generated by the permanent magnets 300, providing a force on the energized coil 302a, 302b. By controlling the direction and strength of the current in the coils 302a, 302b, the force on the coils 302a, 302b via the magnetic field can be controlled, thus controlling movement of the cart 280. The encoder sensor 287 provides feedback information regarding a position of the cart 280 relative to the circular track 204 via interaction with the encoder scale 294. This feedback allows accurate commutation, or reversing, of the current, as well as position, velocity and acceleration feedback for the control system.

Figure 8A:
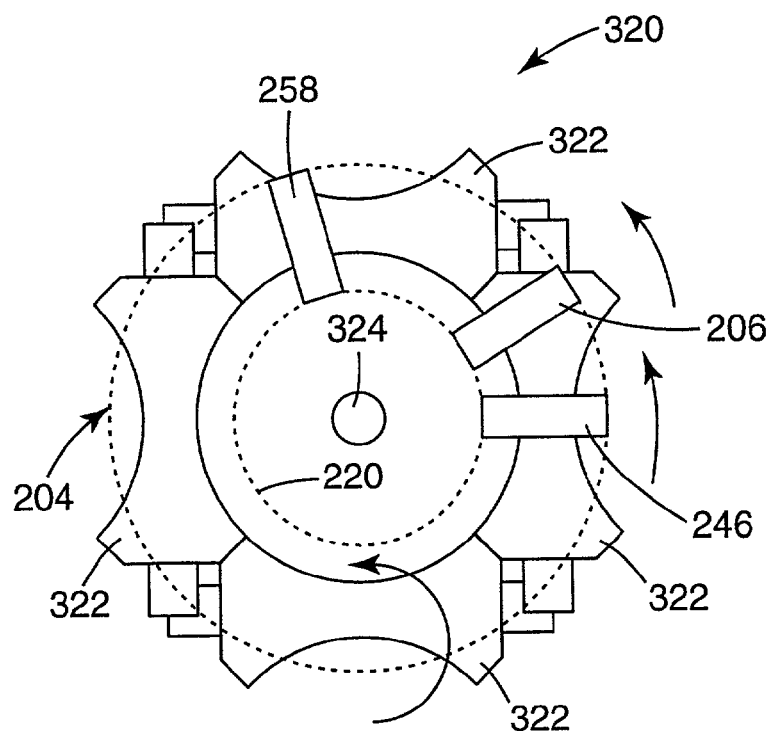
FIG. 8A is a top view of a mechanical-based drive system useful with the devices of FIGS. 5A–5C.
Figure 8B:
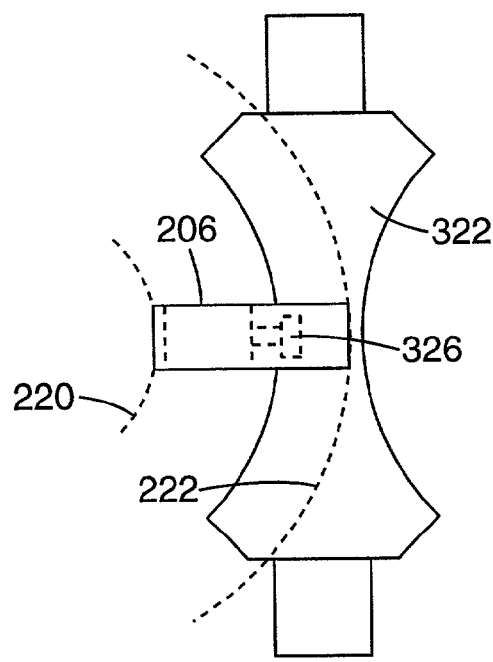
FIG. 8B is a bottom view of a portion of the drive system of FIG. 8A.

In another alterative embodiment, the drive system 205 associated with the device 200 of FIGS. 5A–5C is mechanically-based. For example, FIGS. 8A and 8B illustrate a drive system 320 useful with the device 240 of FIG. 5C. As a point of reference, FIG. 8A schematically illustrates the track 204 and the carts 206, 246, 258 for driving one of the robotic arms 202 (FIG. 5C). For ease of illustration, the various other links 208, 210, 248, 260, 262, (FIG. 5C) have been omitted from the view of FIG. 8A. It will be recognized that each additional robotic arm 202 will include an identical set of three carts 206, 246, 258 pursuant to the embodiment of FIG. 5C. Alternatively, with respect to the embodiment of FIGS. 5A and 5B, each of the carts 206, 246, 258 depicted in FIG. 8A can be the first primary link for a respective one robotic arm 202. In other words, as it relates to the embodiment of FIGS. 5A and 5B, the arrangement of FIG. 8A provides for three robotic arms 202. Regardless, the drive system 320 includes four barrel cams 322 arranged about a center point 324 as shown in FIG. 8A so as to define a continuous circle.

The track 204, including the inner and outer guides 220, 222 (shown schematically in FIG. 8A), is coaxially disposed above the barrel cams 322. Each of the carts 206, 246, 258 are moveably mounted between the guides 220, 222 as previously described such that the track 204 guides the carts 206, 246, 258 through a curved path. Further, as best shown in FIG. 8B, each of the carts 206, 246, 258 includes a follower 326 sized to ride within a track or path formed by, or cut into, the cams 322. Notably, each of the cams 322 can form a separate track for receiving and driving a respective one of the carts 206, 246, 258 via the associated follower 326. That is to say, each of the carts 206, 246, 258 can be connected to, and driven by, a single track formed in each of the cams 322 (via the respective followers 326). Alternatively, two or all of the carts 206, 246, 258 can be driven by separate tracks formed in the cams 322.

During use, the four-barrel cams 322 are driven together, creating a continuous inner cam surface akin to a rotating toroid. The followers 326 are driven by the cams 322, and in turn drive the carts 206, 246, 258 about the track 204. As such, the position, velocity, and acceleration of each of the carts 206, 246, 258, and thus of the robotic arm 202 associated with the respective carts 206, 246, 258, is commonly dictated by the drive system 320. By preferably forming each of the four-barrel cams 322 with three tracks (correlating with the carts 206, 246, 258, respectively), each of the robotic arms 202 (FIG. 5C) is provided with three degrees of freedom driven by only three inputs. With this one particular embodiment, the track 204 is circular.

Figure 9A:
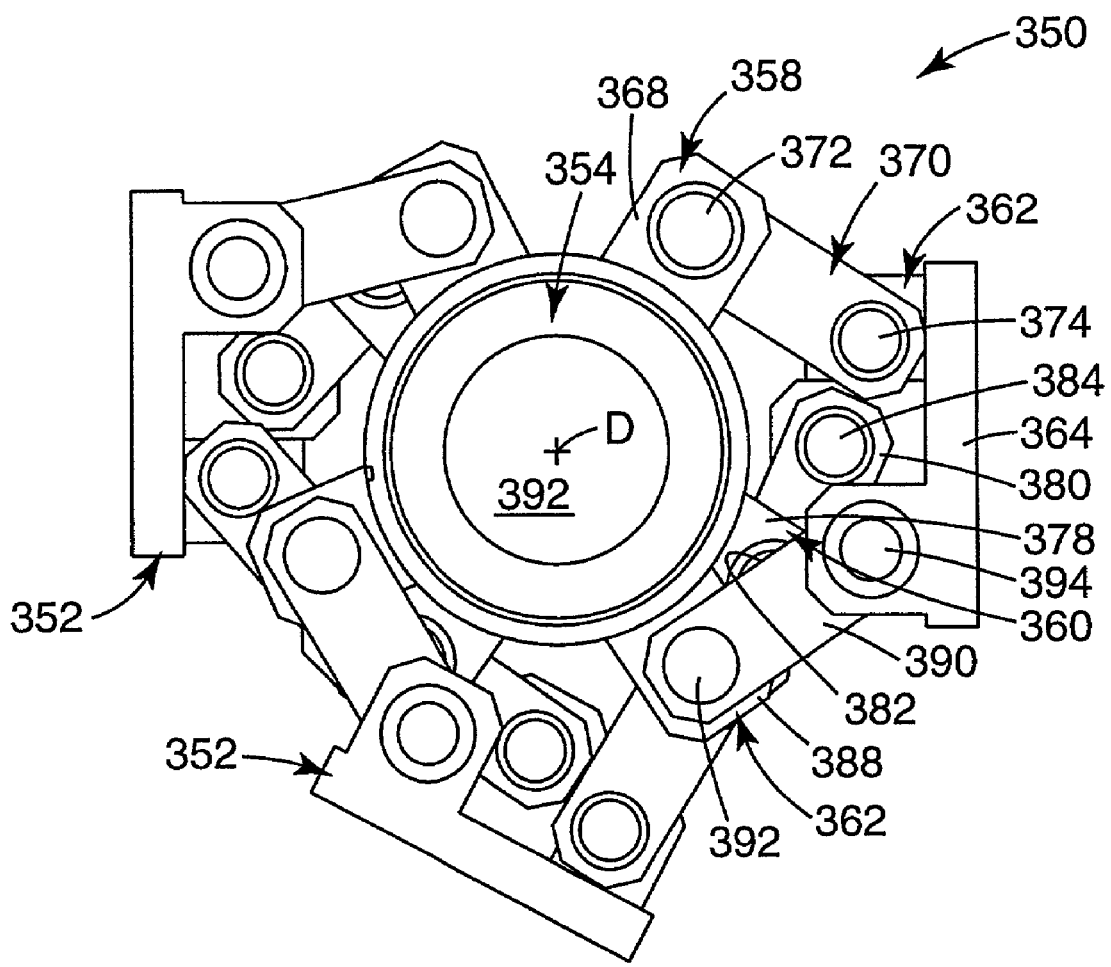
FIG. 9A is a top view of a sixth embodiment, continuous motion robotic device in accordance with the present invention including decoupled robotic arms.
Figure 9B:
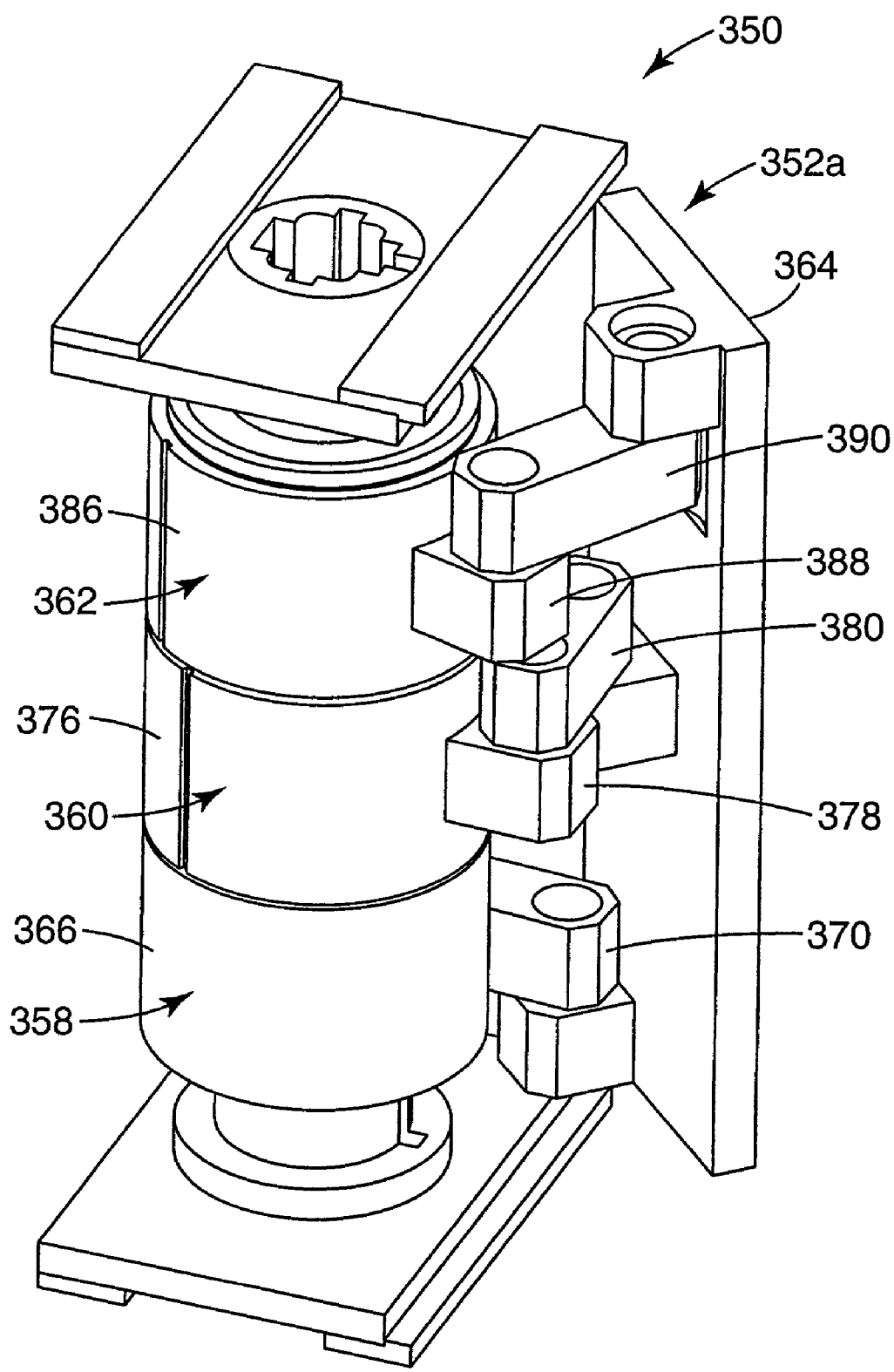
FIG. 9B is a side, perspective view of the device of FIG. 9A.
Figure 9C:
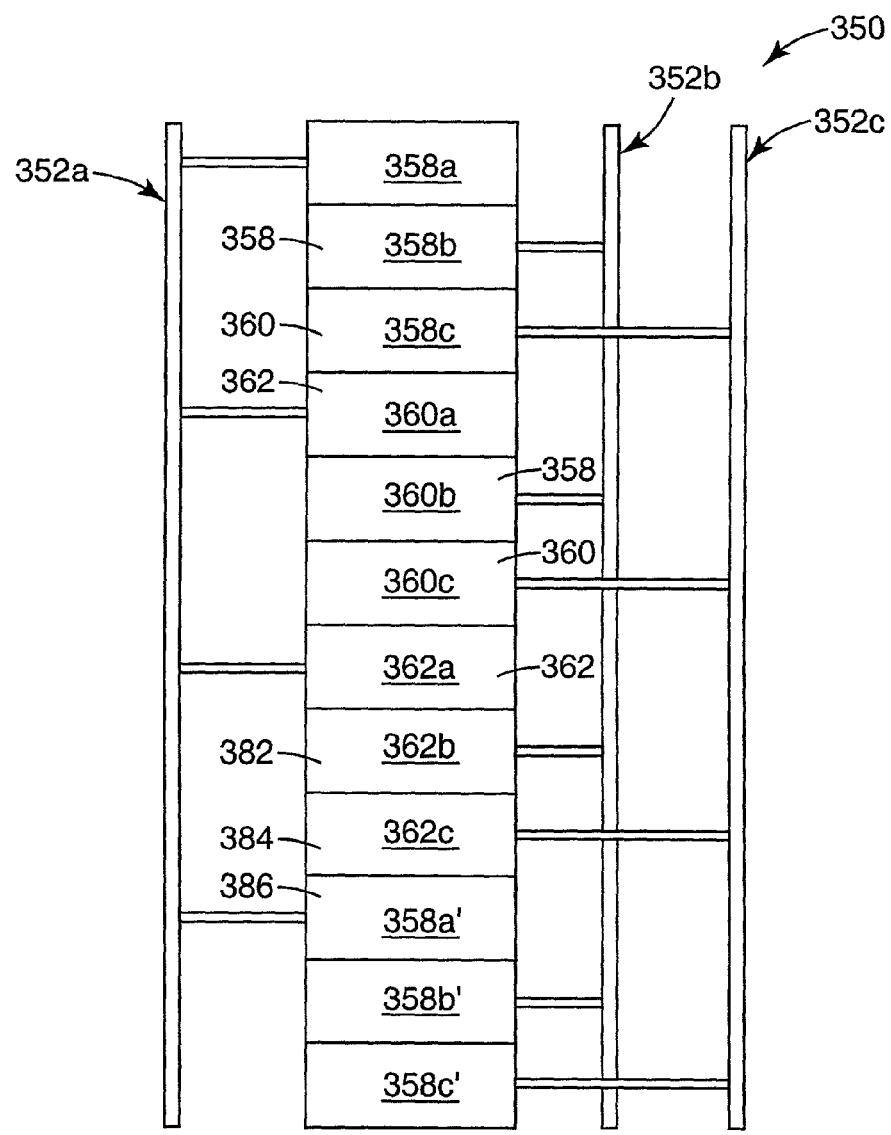
FIG. 9C is a side, schematic illustration of the device of FIG. 9A.

Yet another alternative embodiment decoupled continuous motion robotic device 350 is depicted in FIGS. 9A–9C. With specific reference to the top view of FIG. 9A, the device 350 includes a plurality of robotic arms 352 rotatable about a central hub 354 formed by a drive system 356 (only a portion of which is illustrated in FIGS. 9A–9C). In particular, the robotic arms 352 are coaxially aligned relative to a centerline (referenced as "D" in FIG. 9A) of the central hub 354.

FIG. 9B illustrates construction of the robotic device 350 in greater detail. For ease of illustration, only one of the robotic arms 352a is provided in FIG. 9B, it being understood that each of the robotic arms 352 are preferably identical in construction, and are stacked relative to one another as described in greater detail below. With additional reference to FIG. 9A, the robotic arm 352 includes a first input 358, a second input 360, a third input 362 and an end effector 364. The first input 358 includes a first hub 366, a rigid, extension arm 368 and a first coupler 370. The first coupler 370 is rotatably connected to the first extension arm 368 by a joint 372, and to the end effector 364 by a joint 374. Similarly, the second input 360 includes a second hub 376, a rigid, second extension arm 378 and a second coupler 380. The second coupler 380 is rotatably connected to the second extension arm 378 by a joint 382, and to the end effector 364 by a joint 384. Finally, the third input 362 includes a third hub 386, a rigid, third extension arm 388 and a third coupler 390. The third coupler 390 is rotatably connected to the third extension arm 388 by a joint 392, and to the end effector 364 by a joint 394.

Each of the hubs 366, 376, 386, and their respective extension arms 368, 378, 388, serve as primary inputs or primary links for the robotic arm 352a, with the hubs 366, 376, 386 being rotatable about the center point D (FIG. 9A). Further, by providing each of the inputs 358–362 with the respective couplers 370, 380, 390, the inputs 358–362 serve as kinematic dyads. The stacked arrangement of the inputs 358–362 provides the end effector 364 with three degrees of freedom that are controlled by the relative positions of the three hubs 366, 376, 386, and in particular the respective extension arms 368, 378, 388. In effect, then, any of the three hubs 366, 376, 386 can be designated as a "first primary link," "second primary link," or "third primary link," as each independently dictates a position of the end effector 364. Along these same lines, any of the joints 392 along the axis D can be designated as a "first primary joint," a "second primary joint," or "third primary joint".

Each of the other identically constructed robotic arms 352 (FIG. 9A) are similarly connected to inputs stacked above or below the inputs 358–362. With additional reference to FIG. 9C, for example, three robotic arms 352a–352c are depicted. Each robotic arm 352a–352c is depicted generally as including the inputs 358–362, along with a respective end effector 364. The inputs 358–362 can be rotated individually such that any position of the respective end effectors 364 within its range of motion is available. For example, the end effector 364 can make a perfectly straight, flat motion to, for example, pick objects off of a moving belt, and then swing down and match an inverse arc to place the object on a dial table. To offset potential cantilevering concerns, duplicate inputs 358a', 358b', 358c' are provided for the robotic arms 352a–352c to stiffen the respective end effectors 364.

In one preferred embodiment, each of the hubs 366, 376, 386 are individual, hollow-shaft servo-motors, associated with the drive system 356. The servo-motors can thus dictate a desired rotational speed/sequence for each of the inputs 358–362.

Figure 10A:
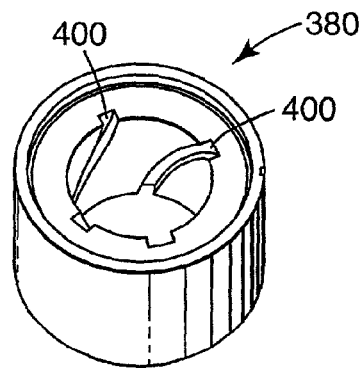
FIG. 10A is a perspective view of a portion of a cam-based drive system for the device of FIG. 10B.

Alternatively, the drive system 356 associated with the device 350 can be cam-based. More particularly, FIG. 10A provides a perspective view of the first hub 366, associated with the first input 358, configured as a cylinder forming inner cam paths 400. Notably, the second and third hubs 376, 386 are basically similarly constructed, although may form varying cam paths to effectuate varying rotation of the various inputs 358–362.

Figure 10B:
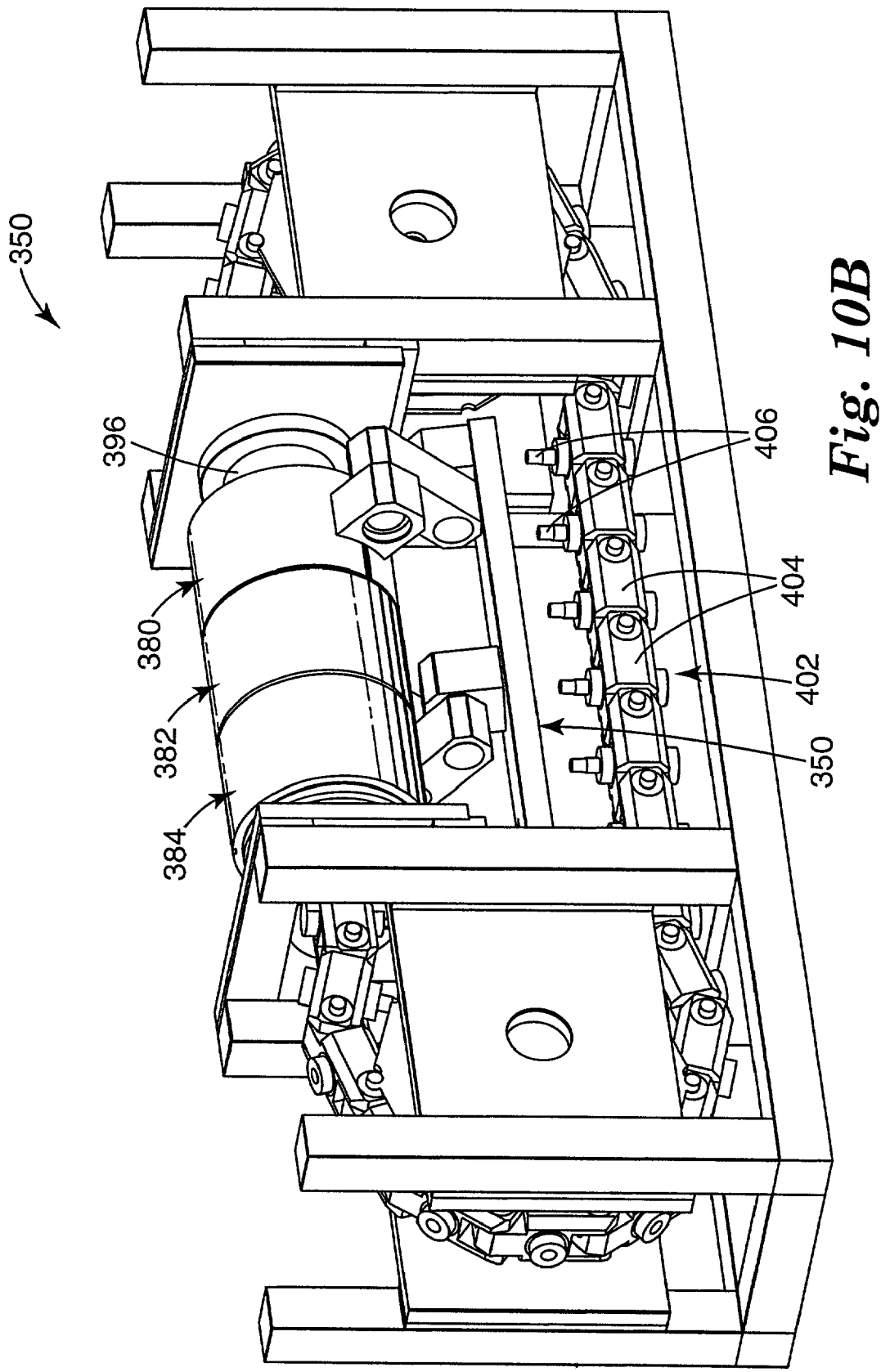
FIG. 10B is a perspective view of the device of FIG. 9A incorporating the drive system of FIG. 10A.

With additional reference to FIG. 10B, one preferred cam-based configuration of the device 350 includes a drive chain 402 having a plurality of links 404 each maintaining a follower 406. The followers 406 are sized to be received within the cam paths 400 formed by the hubs 366, 376, 386. Thus, linear movement of the drive chain 402 through a base tower 396 causes the followers 406 to engage the respective cam paths 400, thereby rotating the respective inputs 358–362. With this configuration, the spatial motion of the end effectors 364 (FIG. 9B) can be "programmed" into the cam paths 400 formed by the hubs 366, 376, 386. As a point of reference, FIG. 10B illustrates only one of the robotic arms 352, it being understood that additional robotic arms 352 would be similarly constructed and driven, essentially elongating the base tower 396.

Figure 11A:
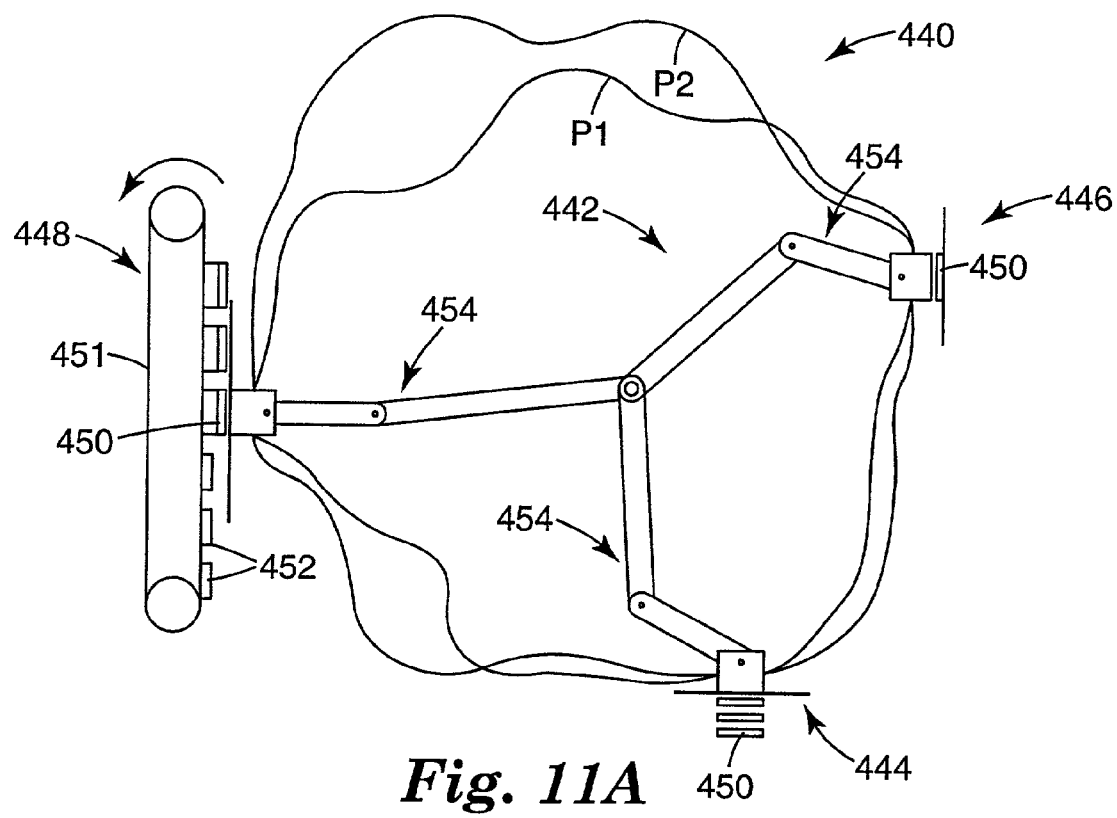
FIGS. 11A and 11B are simplified, block diagrams illustrating use of a continuous motion robotic device in accordance with the present invention.

Regardless of the exact form, the continuous motion robotic device 20, 50, 80, 150, 200, 240 or 350 not only facilitates processing of objects though a wide variety of different paths, but is also preferably highly flexible and can be quickly modified to meet the needs of different work environments, performing a wide variety of object processing such as pick-and-place actions, applying coatings, assembling objects, various other object manipulations, etc. For example, FIG. 11A illustrates a first work environment 440 within which a continuous motion robotic device 442 (shown generally as including three decoupled robotic arms 454) in accordance with the present invention is maintained. While the device 442 is illustrated as conforming with the "decoupled" robotic arm configuration previously described, the "coupled" configuration is also applicable. Regardless, the work environment 440 is shown as defining a first station 444, a second station 446, and a third station 448. It will be understood that the work environment 440 illustrated in FIG. 11A is but one example of a possible application of the robotic device 442. With this in mind, the first station 444 maintains a supply of objects 450. The objects 450 are shown in block form, and can assume virtually any form. The second station 446 represents generally an applicator station at which a coating is applied to one of the objects 450. Finally, the third station 448 includes a conveyor 451 along which a series of other objects 452 are conveyed. The operational sequence includes moving individual ones of the objects 450 from the first station 444 to the second station 446 at which a coating is applied thereto. The coated object 450 is then moved to the third station 448 and placed onto one of the second objects 452. With these parameters in mind, a preferred rotational path (designated as "P1" in FIG. 11A) is determined for the robotic arms 454 as applied within the work environment 440. The drive system (not shown) associated with the robotic device 442 is then configured or programmed to drive the robotic arms 454 through the path P1. For example, the servo-motors or cams associated with the drive system are correspondingly programmed or selected. Once properly configured, the robotic device 442 is installed within the work environment 440 and activated. The robotic device 442 operates such that each of the three robotic arms 454 simultaneously and continuously process objects 450 through each of the three stations 444–448.

From time-to-time, circumstance, such as a slight change in the objects 450, may require a slight change in the path P1 within the work environment 440. For example, the objects 450 may vary in size from batch to batch. This change in size may require a path P2 shown in FIG. 11A. The robotic device 442 can be quickly modified to provide this path by reprogramming servo-motor(s) associated with the drive system and/or changing one or more cams. Alternatively, one or more feedback systems (e.g., position sensors, vision systems, etc.) may indicate that something within the work environment 440 has changed (e.g., locations of the objects 450 in the first section 444 deviating from an expected position). The robotic device 442 utilizes this feedback information, indicative of a change or revision in operational parameters, to quickly achieve a revised or corrected path.

Figure 11B:
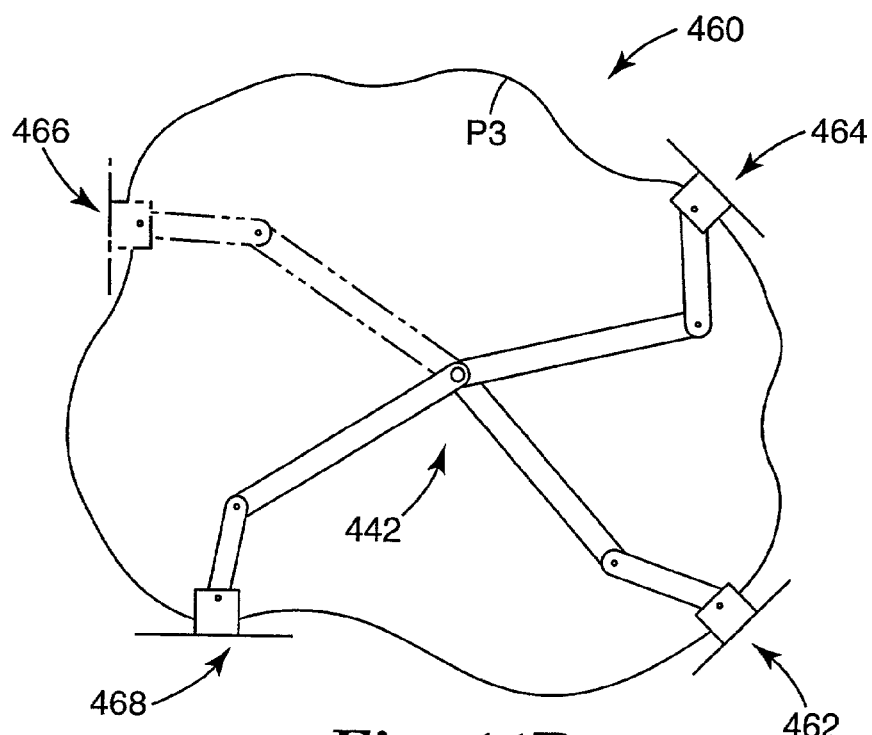
Figure 11C:
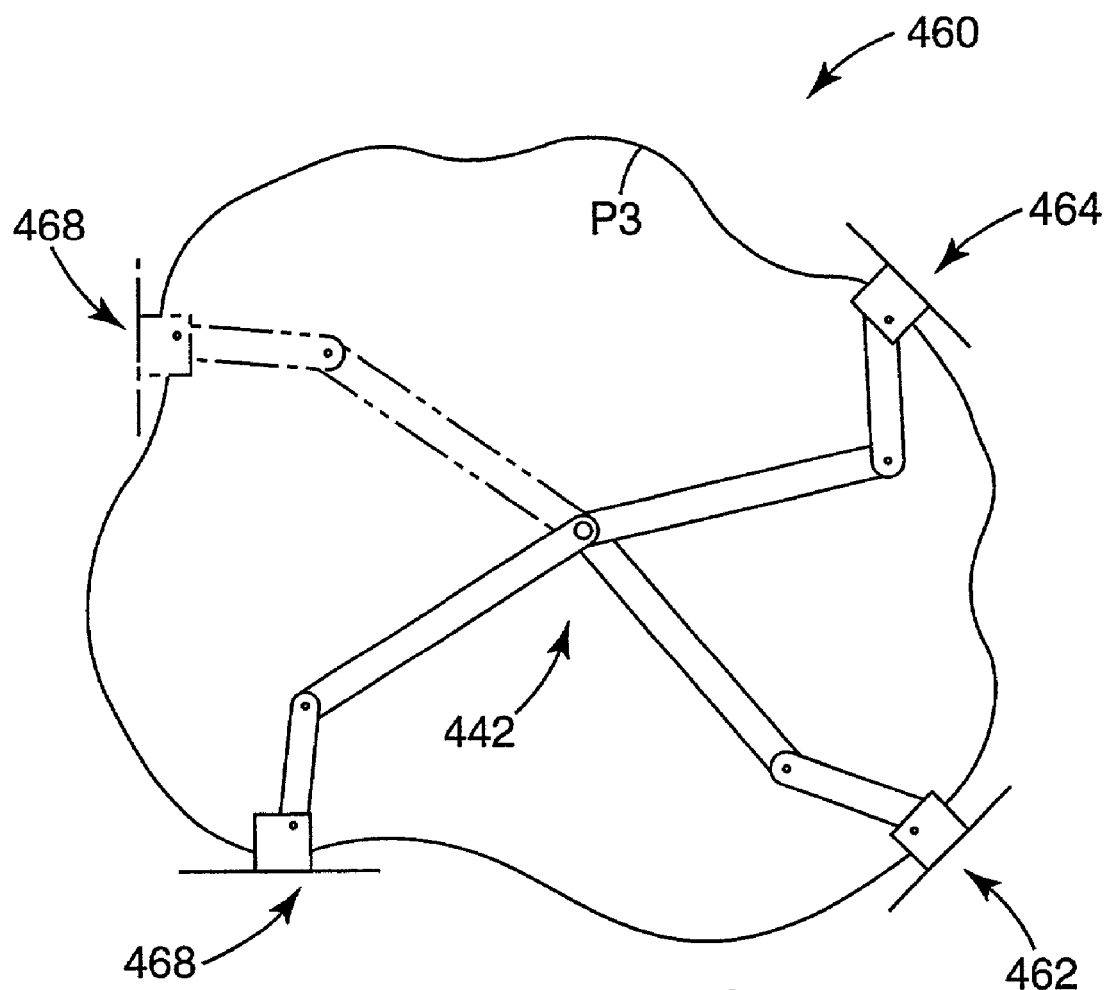

Similarly, the same robotic device 442 can easily be reconfigured for application in a second work environment 460 as shown in FIG. 11B. In this regard, the second work environment 460 is shown as generally as including first, second, third, and fourth stations 462–468. Once again, objects 470 must be processed through the stations 462–468. Based upon the parameters/requirements of the stations 462–468, a rotational path P3 for the arms 454 can be determined. While the path P3 associated with the second work environment 460 is quite different from that of the first work environment (P1 in FIG. 11A), the robotic device 442 can be used within the second work environment 460 with minimal change. In particular, only the drive system (not shown) is altered. For example, where the robotic device 442 utilizes a servo-motor based drive system, one or more of the servo-motors are simply reprogrammed to achieve the arm path requirements of the second work environment 360. Alternatively, where the drive system is associated with the robotic device 342 utilizes cams, one or more of the cams can be replaced with a different cam specifically formatted to satisfy the path requirements of the second work environment 460.

The continuous motion robotic device of the present invention provides a marked improvement over previous designs. A plurality of robotic arms are coaxially arranged to continuously rotate about a common central point. In one preferred embodiment, each of the arms is provided with three degrees of freedom. Regardless of the number of degrees of freedom, each link associated with each arm is commonly driven by a single input, such that the resulting device is highly flexible for varying work environment requirements. In particular, by being highly flexible and able to operate at high speeds, the continuous motion robotic device of the present invention uniquely combines the advantages of traditional dedicated machinery and robotic machinery.

Although the present invention has been described with reference to preferred embodiments, workers skilled in the art will recognize that changes can be made in form and detail without departing from the spirit and scope of the present invention.

What is claimed is:

1. A continuous motion robotic device for processing objects, the device comprising:
   a first robotic arm;
   a second robotic arm;
   a third robotic arm;
   wherein the robotic arms are decoupled and each configured to rotate a full 360° and each include an end effector for performing work on an object, and further wherein the robotic arms are arranged about a central axis relative to one another, and further wherein at least a portion of two of the arms may pass through different angles, relative to the central axis, at the same point in time; and a drive system commonly controlling the robotic arms, the drive system defining a central axis about which the robotic arms rotate.

2. The device of claim 1, wherein the robotic arms are identical.

3. The device of claim 1, wherein each of the robotic arms includes a first, second and third primary link.

4. The device of claim 1, wherein each of the robotic arms includes a first primary link, a second primary link, a first primary joint connecting the first primary link to the drive system, and a second primary joint connecting the first and second primary links.

5. The device of claim 4, wherein the second primary joints are rotary joints.

6. The device of claim 4, wherein the first primary joints and the second primary joints move independent of one another such that upon activation of the drive system, the robotic arms are directed through substantially identical paths and the end effectors are positioned at a different radial distance relative to the centerpoint during at least one point in time.

7. The device of claim 6, wherein the drive system includes:

a closed loop track having an instant center at any point in time that defines the center point; and a plurality of first carts separately and moveably coupled to the track, respective ones of which define respective ones of the first primary links, the instant center point of the track defining the first primary joint.

8. The device of claim 7, wherein each of the robotic arms further includes a third primary link connected to the second primary link by a third primary joint.

9. The device of claim 7, wherein the drive system further includes a plurality of second joint servo-motors, respective ones of which are connected to and drive respective ones of the second primary joints.

10. The device of claim 9, wherein each of the robotic arms further includes a third primary link connected to the second primary link by a third primary joint, and further wherein the drive system further includes a plurality of third joint servo-motors, respective ones of which are connected to and drive respective ones of the third primary joints.

11. The device of claim 7, wherein the track includes an inner guide member and an outer guide member, each of the carts being moveably mounted between the guide members.

12. The device of claim 11, wherein the drive system further comprises:

a stationary gear coaxially disposed below the track, the stationary gear having a toothed surface extending adjacent the inner guide member; and a plurality of drive gears, respective ones of which are secured to respective ones of the plurality of carts, the drive gears being configured to interface with the stationary gear upon final assembly;

wherein rotation of the drive gears causes the respective cart to articulate about the track via the stationary gear.

13. The device of claim 1, wherein each of the three robotic arms are co-planar.

14. The device of claim 1, wherein the unrestricted motion is a dwell when the other arms are rotating.

* * * * *